US010843285B2

(12) United States Patent
Kishikawa et al.

(10) Patent No.: US 10,843,285 B2
(45) Date of Patent: Nov. 24, 2020

(54) WELDING DEVICE

(71) Applicant: Kobe Steel, Ltd., Kobe (JP)

(72) Inventors: Hirohisa Kishikawa, Kanagawa (JP); Shun Izutani, Kanagawa (JP); Shigeto Takada, Kanagawa (JP); Hiroshi Matsumura, Tokyo (JP)

(73) Assignee: Kobe Steel, Ltd., Kobe (JP)

(*) Notice: Subject to any disclaimer, the term of this patent is extended or adjusted under 35 U.S.C. 154(b) by 57 days.

(21) Appl. No.: 16/319,838

(22) PCT Filed: Jul. 18, 2017

(86) PCT No.: PCT/JP2017/025937
§ 371 (c)(1),
(2) Date: Jan. 23, 2019

(87) PCT Pub. No.: WO2018/021091
PCT Pub. Date: Feb. 1, 2018

(65) Prior Publication Data
US 2019/0262928 A1 Aug. 29, 2019

(30) Foreign Application Priority Data

Jul. 27, 2016 (JP) ................. 2016-147869

(51) Int. Cl.
B23K 9/095 (2006.01)
B23K 9/00 (2006.01)
(Continued)

(52) U.S. Cl.
CPC .......... B23K 9/0953 (2013.01); B23K 9/0026 (2013.01); B23K 9/095 (2013.01);
(Continued)

(58) Field of Classification Search
CPC ...... B23K 9/905; B23K 9/0953; B23K 7/047; B23K 9/235
See application file for complete search history.

(56) References Cited

U.S. PATENT DOCUMENTS 3,549,857 A * 12/1970 Carter .................... B23K 9/235
219/137 R
5,319,179 A * 6/1994 Joecks ................. B23K 13/015
219/137 R
9,114,473 B2 * 8/2015 Guymon ................ B23K 9/235

FOREIGN PATENT DOCUMENTS

CN 103744455 A 4/2014
CN 105312738 A 2/2016
(Continued)

OTHER PUBLICATIONS

Machine translation of Japan Patent No. 09192389, May 2020.*
Machine translation of Japan Patent No. 2013202673, May 2020.*
Machine translation of WO-2013154451, May 2020.*
Extended European Search Report dated Mar. 31, 2020 in Patent Application No. 17834099.8, 6 pages.
International Search Report dated Sep. 19, 2017 in PCT/JP2017/025937 filed on Jul. 18, 2017.

Primary Examiner — Geoffrey S Evans
(74) Attorney, Agent, or Firm — Oblon, McClelland, Maier & Neustadt, L.L.P.

(57) ABSTRACT

A welding device for welding a workpiece using a welding robot includes a welding control device that controls operation of the welding robot and a preheating device that preheats the workpiece. The welding control device includes an input unit through which at least one or both of dimensions of the workpiece and a shape of a welding joint, and preheating information are inputted, and a storage unit that includes at least welding robot operation orbit teaching data, welding condition data, and preheating condition data. The welding control device automatically provides a preheating condition, a welding robot operation orbit, and a welding condition for the welding joint to be welded, and preheating and welding are performed.

16 Claims, 27 Drawing Sheets

(51) Int. Cl.
  *B23K 9/12*    (2006.01)
  *B23K 9/127*   (2006.01)
  *B23K 9/235*   (2006.01)
  *B23K 37/02*   (2006.01)
  *B23K 37/047*  (2006.01)
  *B25J 13/08*   (2006.01)
  *B23K 103/04*  (2006.01)
  *B23K 101/28*  (2006.01)

(52) U.S. Cl.
  CPC .............. *B23K 9/0956* (2013.01); *B23K 9/12* (2013.01); *B23K 9/127* (2013.01); *B23K 9/235* (2013.01); *B23K 37/0229* (2013.01); *B23K 37/047* (2013.01); *B25J 13/08* (2013.01); *B23K 9/00* (2013.01); *B23K 2101/28* (2018.08); *B23K 2103/04* (2018.08)

(56) References Cited

FOREIGN PATENT DOCUMENTS

| | | | | |
|---|---|---|---|---|
| JP | 61-52989 | A | | 3/1986 |
| JP | 6-182578 | A | | 7/1994 |
| JP | 09192389 | A | * | 7/1997 |
| JP | 2001-300770 | A | | 10/2001 |
| JP | 2004-314108 | A | | 11/2004 |
| JP | 2013-202673 | A | | 10/2013 |
| JP | 2013202673 | A | * | 10/2013 |
| WO | WO-2013154451 | A1 | * | 10/2013 ............... B23K 9/23 |

* cited by examiner

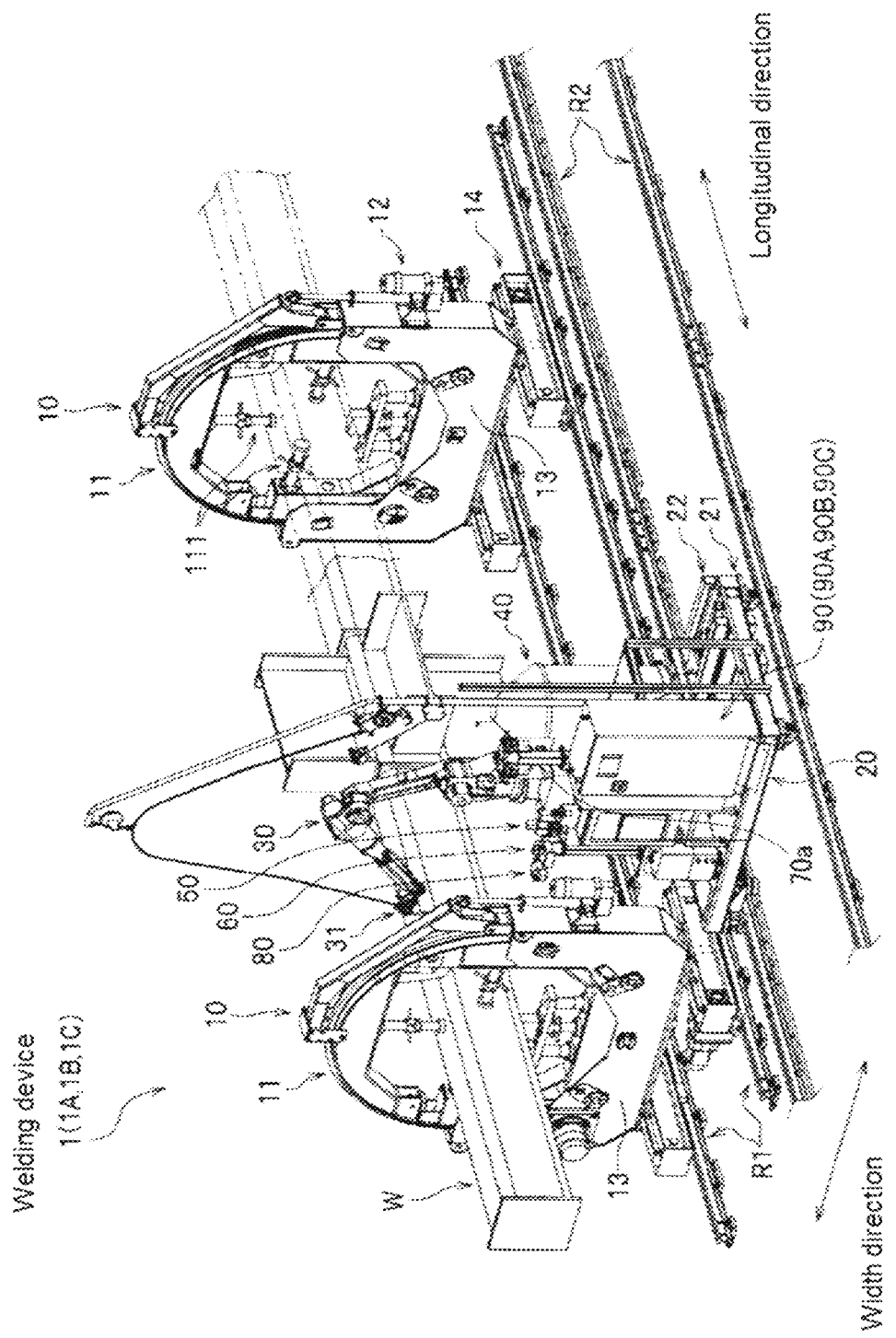

If current conduction cannot be detected, proceeding to retry process

Detecting current conduction by the reduction of sensing voltage

Reverse inching until the sensing voltage rises

Further reverse inching by predetermined length to improve arc starting property If current conduction cannot be detected, further reverse inching of wire by predetermined length After reverse inching, lifting up a torch at a predetermined position set with reference to the arc start position in the XYZ directions Moving to the position shifted in the XYZ directions with reference to the arc start position Applying the sensing voltage again and executing current conduction detection process If current conduction cannot be detected, reverse inching the wire by predetermined length again Executing lifting up process in same manner and repeat these process until detecting or predetermined times

WELDING DEVICE

TECHNICAL FIELD

The present invention relates to a welding device, and particularly relates to a welding device automating preheating work and welding work.

BACKGROUND ART

In the background art, preheating work for preventing weld cracking is typically performed manually using a burner in order to deal with different preheating conditions depending on a workpiece or a weld place. Thus, a preparatory work time is required before welding work is executed. A method for working with a welding work assisting tool removably attached to a welding torch or a welding torch motion mechanism portion (for example, see Patent Literature 1) is known as a method for automating the preheating work.

CITATION LIST

Patent Literature

Patent Literature 1: JP-A-2001-300770

SUMMARY OF THE INVENTION

Problem that the Invention is to Solve

In the method disclosed in Patent Literature 1, the preheating work can be automated. However, for example, when a large-size workpiece such as a steel structure is welded, preheating conditions differ in accordance with dimensions, plate thickness, a joint shape, etc. It is therefore necessary to input data of the preheating conditions for each weld place, as well as data of welding conditions. There is a problem that it takes much time for preparation before the start of the welding work.

The present invention has been developed in consideration of the aforementioned problem. An object of the invention is to provide a welding device capable of automating preheating work and welding work to optimize a series of works from the preheating work to the welding work.

Means for Solving the Problem

The aforementioned object of the invention is attained by the following configurations.
(1) A welding device for welding a workpiece using a welding robot, including:
a welding control device that controls operation of the welding robot; and
a preheating device that preheats the workpiece,
the welding control device including:
an input unit through which at least one or both of dimensions of the workpiece and a shape of a welding joint, and preheating information are inputted; and
a storage unit that includes at least welding robot operation orbit teaching data, welding condition data, and preheating condition data,
wherein the welding control device automatically provides a preheating condition, a welding robot operation orbit, and a welding condition for the welding joint to be welded based on one or both of the dimensions of the workpiece and the shape of the welding joint, and the preheating information, and based on the welding robot operation orbit teaching data, the welding condition data and the preheating condition data prepared in advance in the storage unit, and preheating and welding are performed.

According to the welding device configured thus, the preheating conditions and the welding conditions can be automatically provided concurrently with each other or independently of each other based on the dimensions of the workpiece or the joint information. Thus, workability can be improved.

(2) A welding device for welding a workpiece using a welding robot, including:
a welding control device that controls operation of the welding robot; and
a preheating device that preheats the workpiece, the welding control device including:
an input unit through which at least one or both of dimensions of the workpiece and a shape of a welding joint, and preheating information are inputted; and
a storage unit that includes at least welding condition data and preheating condition data,
wherein the welding control device automatically provides a preheating condition, a welding robot operation orbit, and a welding condition for the welding joint to be welded based on one or both of the dimensions of the workpiece and the shape of the welding joint, and the preheating information, and based on the welding condition data and the preheating condition data prepared in advance in the storage unit, and preheating and welding are performed.

According to the welding device configured thus, the preheating conditions and the welding conditions can be automatically provided concurrently with each other or independently of each other based on the dimensions of the workpiece or the joint information. Thus, workability can be improved.

(3) It is preferable that the preheating device includes a preheating torch, and
the preheating torch is at least provided on a carriage that can move in a longitudinal direction of the workpiece, provided exclusively at an end of the welding robot, or provided at an end of the welding robot replaceably by the preheating torch.

According to the welding device configured thus, preheating can be optimized.
(4) It is preferable that the preheating conditions include a preheating temperature, and
the preheating temperature is measured by a temperature sensor, and controlled by the preheating device to reach a set preheating temperature determined in advance through input by a worker.

According to the welding device configured thus, the preheating temperature of the workpiece can be controlled more surely to the set preheating temperature.
(5) It is preferable that the welding device further includes:
a pair of rotary positioners that are provided movably in a longitudinal direction of the workpiece and hold and rotate the workpiece;
a carriage, provided movably in a parallel direction to the direction in which the pair of the rotary positioners moves;
the welding robot, provided on the carriage movably in a perpendicular direction to the direction in which the rotary positioners move; and
a welding torch, provided at an end of the welding robot,
wherein the pair of rotary positioners include:

a pair of annular holding members that receive the workpiece internally and hold the workpiece with a plurality of fixing jigs; and a driving member configured to rotate one or both of the pair of annular holding members, and wherein each of the annular holding members is divided at a predetermined position of an annular portion to form a part of the annular portion to be open, so that the workpiece can be received in the annular holding members.

According to the welding device configured thus, the steel structure is held by the pair of rotary positioners. In addition, for example, when a straight part of the steel structure is welded by the welding robot, it is possible to weld the straight part by the welding robot without rotating the steel structure. On the other hand, when an arc part (i.e., corner portion) of the steel structure is welded by the welding robot, it is possible to weld the arc part while rotating the steel structure. Accordingly, the welding device can weld not only the straight part of the steel structure but also the arc part of the steel structure continuously without disconnecting an arc for welding.

(6) It is preferable that the welding device further includes:

a pair of rotary positioners that are provided movably in a longitudinal direction of the workpiece and hold and rotate the workpiece;

a plurality of carriages, provided movably in a parallel direction to the direction in which the pair of rotary positioners move;

the welding robots, provided on the plurality of carriages respectively movably in a perpendicular direction to the direction in which the rotary positioners move; and a welding torch, provided at an end of each of the welding robots, wherein the pair of rotary positioners include:

a pair of annular holding members that receive the workpiece internally and hold the workpiece with a plurality of fixing jigs; and a driving member configured to rotate one or both of the pair of annular holding members, and wherein each of the annular holding members is divided at a predetermined position of an annular portion to form a part of the annular portion to be open, so that the workpiece can be received in the annular holding members.

According to the welding device configured thus, the steel structure is held by the pair of rotary positioners. In addition, for example, when different straight parts of the steel structure are welded by the welding robots provided on the carriages respectively, it is possible to weld the straight parts by the plurality of welding robots without rotating the steel structure. On the other hand, when different arc parts (i.e., corner portions) of the steel structure are welded by the welding robots provided on the carriages respectively, it is possible to weld the arc parts by the plurality of welding robots while rotating the steel structure. Accordingly, the welding device can weld not only the straight parts of the steel structure but also the arc parts of the steel structure continuously without disconnecting an arc for welding.

(7) It is preferable that the welding control device includes:

a sensing unit configured to detect a position of the workpiece by applying a sensing voltage between a welding torch supporting a welding wire set to have a predetermined extension and the workpiece, and detecting a current conduction state caused by contact between the welding wire and the workpiece; and a root gap calculating unit configured to determine a root gap based on data of detected positions of both groove faces in a groove width direction from a detection start position of a predetermined depth relative to a set groove depth from at least one surface of the workpiece, the data of detected positions of the both groove faces being detected by the sensing unit, a difference between the set groove depth and the detection start position, and preset angles of both of the groove faces.

According to the welding device configured thus, the position of the steel structure can be detected by the sensing unit, and the root gap can be calculated based on the position of the steel structure by the root gap calculating unit. It is therefore unnecessary to detect a position of a bottom surface of the groove, but it is possible to determine the root gap, for example, regardless of irregularities generated by temporary welding on a backing member or adhesion of a slag by the temporary welding.

(8) It is preferable that the welding control device automatically provides a lamination pattern, preheating conditions, heat input conditions, inter-pass temperature conditions and welding conditions for the welding joint to be welded, based on a lamination pattern, preheating conditions, heat input conditions and welding conditions prepared in advance for dimensions of the workpiece or for the dimensions and root gap of the workpiece, and a root gap determined through input or sensing.

According to the welding device configured thus, it is possible to automatically provide preheating conditions, a lamination pattern and welding conditions based on dimensions of the steel structure or the dimensions and root gap of the steel structure.

(9) It is preferable that the welding control device automatically provides a lamination pattern and welding conditions for the welding joint to be welded, based on a lamination pattern and welding conditions prepared in advance for dimensions of the workpiece or for the dimensions and root gap of the workpiece, and a root gap determined through input or sensing, and when a plurality of welding joints having different volumes to be welded due to different sectional areas of the workpiece or different welding lengths of the workpiece or both of them are welded concurrently by the plurality of welding robots, a feeding amount of the welding wire is controlled to be changed to compensate the difference in the volume to be welded in order to equalize a welding time from a base point to a next base point.

According to the welding device configured thus, the feeding amount of the welding wire is changed from the plurality of welding robots are made different from each other so that the welding joints having different volumes to be welded can be welded concurrently by the plurality of welding robots.

(10) It is preferable that the welding control device sets a proper welding current range in which welding can be performed in each of passes, performs welding within the range in the pass, and makes control to compensate a difference in thickness generated as a result of the welding in another following pass so that the total thickness is within a desired range.

According to the welding device configured thus, a difference in thickness occurring during welding in one pass can be compensated in another subsequent pass, so that the total thickness can be put within a desired range. Thus, the plurality of welding joints can be welded concurrently efficiently and properly by the plurality of welding robots.

(11) It is preferable that when welding cannot be performed within a proper welding current range in which welding can be performed in each of passes, the welding control device makes control to weld the welding joints individually in at least one of the passes so that a total error in thickness is compensated.

According to the welding device configured thus, the welding joints are welded individually in at least one of the passes so that the total error in thickness is compensated. Thus, in spite of a large difference in volume to be welded from one base point to another in each of the welding joints, the plurality of welding joints can be welded concurrently efficiently and properly by the plurality of welding robots.

(12) It is preferable that when welding cannot be performed within a proper welding current range in which welding can be performed in each of passes, the welding control device makes control to increase a difference in wire feeding amount and to change an extension of the welding wire so that a welding current being out of the proper range is set at a desired value.

According to the welding device configured thus, the extension of the welding wire is changed among the plurality of welding robots so that the plurality of welding joints can be welded concurrently efficiently by the plurality of welding robots while keeping a proper welding current.

(13) It is preferable that the welding device further includes:
 a nozzle exchanging device that exchanges a nozzle provided at an end of the welding torch,
 the nozzle exchanging device including:
 a coil spring to which the nozzle can be inserted; and
 a rotary drive source that rotationally drives the coil spring, to which the nozzle is inserted, around a central axis of the coil spring, so as to remove the nozzle from a torch body of the welding torch.

According to the welding device configured thus, even when the nozzle is inserted into the coil spring so as to be deviated therefrom, the coil spring can easily follow the deviation due to deformation and flexibility of the coil spring. Thus, the nozzle can be exchanged surely in spite of thermal deformation or a dimensional error of the nozzle.

(14) It is preferable that the welding device further includes:
 a slag removing device provided at an end of the welding robot, the slag removing device removing a slag generated in a weld portion of the workpiece.

According to the welding device configured thus, a slag generated in the weld portion can be removed. Thus, welding failure or welding defects can be prevented.

(15) It is preferable that the welding control device includes:
 a sensing unit configured to detect a position of the workpiece by applying a sensing voltage between the welding torch supporting a welding wire set to have a predetermined extension and the workpiece, and detecting a current conduction state caused by contact between the welding wire and the workpiece;
 a central position calculating unit configured to calculate a central position of the workpiece based on dimensions of the workpiece inputted in advance, and the position of the workpiece detected by the sensing unit;
 an eccentricity calculating unit configured to calculate an amount of eccentricity of the workpiece relative to a rotation center of each of the rotary positioners, based on rotation center positions of the rotary positioners inputted in advance, and the central position of the workpiece; and
 a correction unit configured to correct the welding robot operation orbit based on the amount of eccentricity calculated by the eccentricity calculating unit.

According to the welding device configured thus, the central position of the steel structure can be calculated by the central position calculating unit, and the amount of eccentricity of the steel structure can be calculated by the eccentricity calculating unit. Thus, it is possible to perform welding accurately even on the steel structure being rotated with eccentricity by the rotary positioners.

(16) It is preferable that the welding control device edits preheating timings as the preheating conditions for welding the welding joints, and
 the welding control device selects one of a method in which preheating and welding are performed alternately for each of the plurality of welding joints, and a method in which all the welding joints are welded after all the plurality of welding joints are preheated.

According to the welding device configured thus, optimum preheating timings can be selected when the plurality of welding joints are welded.

Advantage of the Invention

A welding device according to the invention can automatically provide an operation orbit of a welding robot, preheating conditions and welding conditions based on information, such as dimensions of a workpiece such as a steel structure, inputted to an input unit of a welding control device, and preheating information. Accordingly, it is possible to automate a series of work from preheating work to welding work to optimize the series of work without individually providing at least one or all of teaching data such as the operation orbit, the preheating conditions, the welding conditions.

BRIEF DESCRIPTION OF THE DRAWINGS

FIG. 1 is a schematic view showing an overall configuration of a welding device according to each embodiment of the invention.

MODE FOR CARRYING OUT THE INVENTION

Figure 2A:
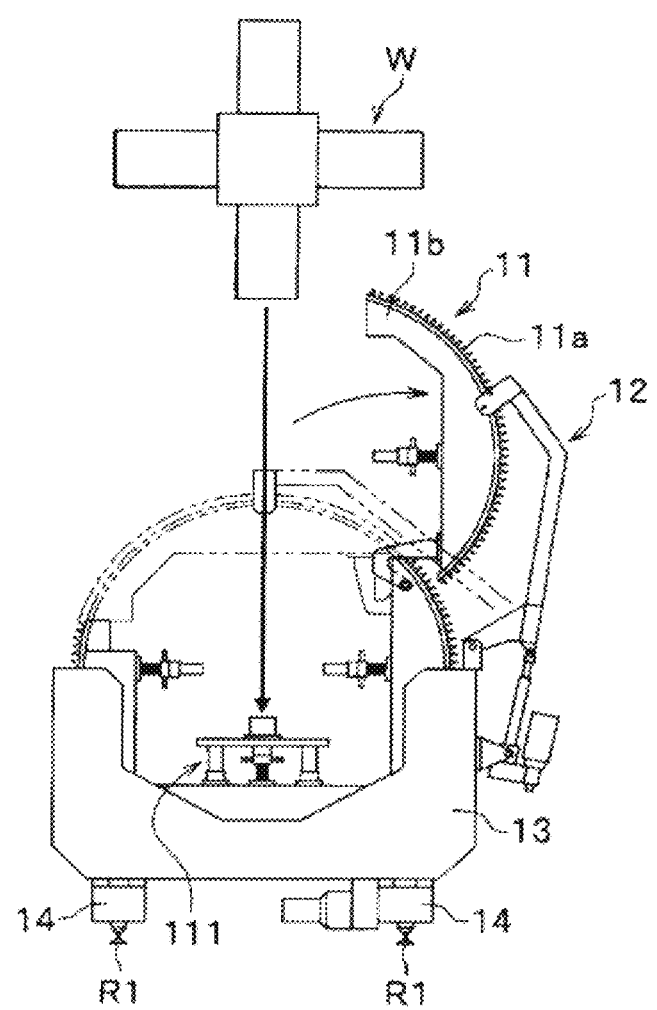
FIG. 2A is a schematic view for illustrating a configuration and operation of a rotary positioner provided in the welding device according to the embodiment of the invention, the view showing a state in which an arc part of an annular holding member has been opened.

Each embodiment of a welding device according to the invention will be described below in detail with reference to the drawings. For convenience of explanation, sizes or shapes of members in the drawings may be exaggerated or depiction of a partial configuration may be omitted.

First Embodiment

A welding device according to a first embodiment of the invention will be described with reference to FIG. 1 to FIG. 13.

The welding device 1 welds a steel structure W, which is a workpiece, for example, by gas shielded arc welding. As shown in FIG. 1, the welding device 1 has rotary positioners 10, a carriage 20, a welding robot 30, a wire supply vessel 40, a nozzle exchanging device 50, a nozzle cleaning device 60, a wire cutting device 80, and a welding control device 90. In addition, the welding device 1 has a slag removing device 70 and a preheating device 200 (see FIG. 6 and FIG. 7) in addition to the configuration shown in FIG. 1.

(Rotary Positioner)

During welding, the rotary positioners 10 hold the steel structure W and rotate the steel structure W. The rotary positioners 10 are configured to be paired as shown in FIG. 1, so as to hold the columnar steel structure W at two points in a longitudinal direction of the steel structure W. The rotary positioners 10 do not rotate the steel structure W when a straight part of the steel structure W is, for example, welded by the welding robot 30, but rotate the steel structure W when an arc part (i.e., corner portion) of the steel structure W is welded by the welding robot 30. In this manner, the welding device 1 can weld not only the straight part of the steel structure W but also the arc part of the steel structure W continuously without disconnecting an arc for welding. Each of the rotary positioners 10 here has an annular holding member 11, a lifting arm 12, a bracket 13, and rail carriages 14 as shown in FIG. 1.

The annular holding member 11 receives and holds the steel structure W internally. Inside the annular holding member 11, a plurality of fixing jigs 111 for holding the steel structure W on four sides are stretchably/contractibly provided as shown in FIG. 1. The annular holding member 11 fixes the steel structure W by the fixing jigs 111 holding the steel structure W on the four sides as shown in FIG. 1. In addition, a gear 11a is formed in the outer circumference of the annular holding member 11 as shown in FIG. 2A. As will be described later, the gear 11a is arranged to engage with a pinion gear 131 provided inside the bracket 13 (see FIG. 3A and FIG. 3B). Incidentally, the gear 11a excluding a part (only the right side of the circumference) is not shown in FIG. 1.

The lifting arm mechanism 12 divides the annular holding member 11 so as to open/close the annular holding member 11. The lifting arm mechanism 12 is provided at a side (right side here) of the annular holding member 11 and the bracket 13 as shown in FIG. 2A. One end side of the lifting arm mechanism 12 is connected to an upper portion of the annular holding member 11, and the other end side is connected to a side face (right side here) of the bracket 13.

Figure 2B:
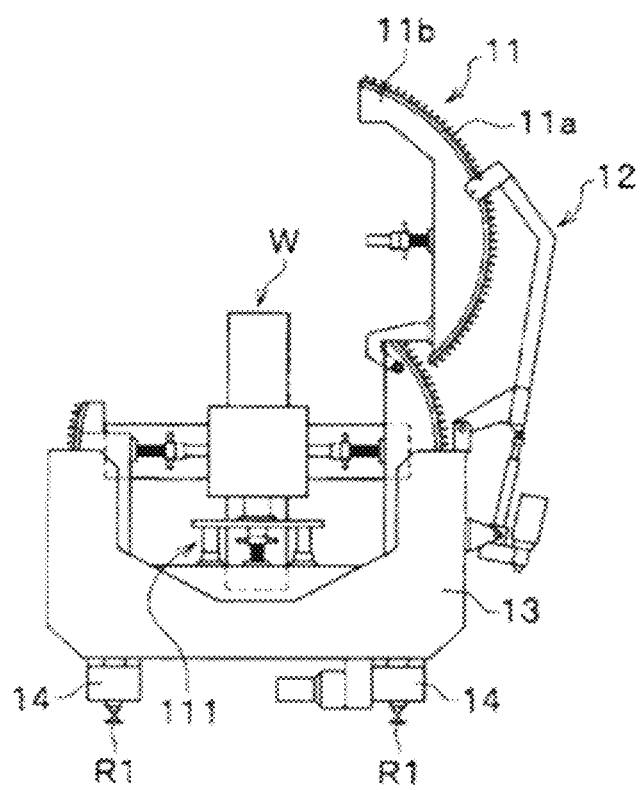
FIG. 2B is a schematic view for illustrating the configuration and the operation of the rotary positioner provided in the welding device according to the embodiment of the invention, the view showing a state in which a steel structure has been received inside the annular holding member.
Figure 2C:
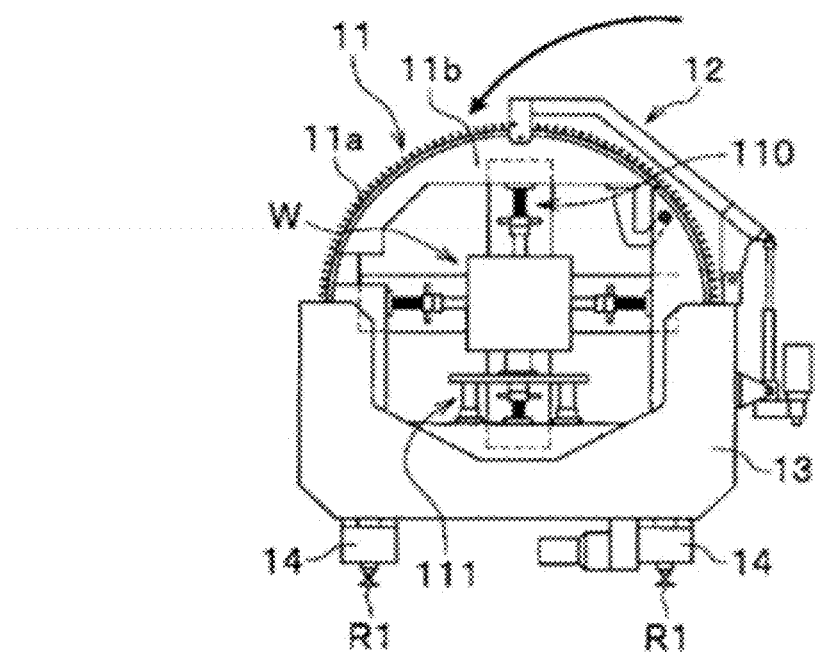
FIG. 2C is a schematic view for illustrating the configuration and the operation of the rotary positioner provided in the welding device according to the embodiment of the invention, the view showing a state in which the arc part of the annular holding member has been closed.

Specifically as shown in FIG. 2A, the lifting arm mechanism 12 opens the annular holding member 11 so as to divide the annular holding member 11 at a predetermined position, and to separate a part of the annular holding member 11, that is, an arc part 11b from the other part of the annular holding member 11 so that the steel structure W can be received in the annular holding member 11. When the steel structure W is received as shown in FIG. 2B, the lifting arm mechanism 12 closes the arc part 11b again as shown in FIG. 2C. Thus, the steel structure W is held by the four fixing jigs 111 provided inside the annular holding member 11.

Figure 3A:
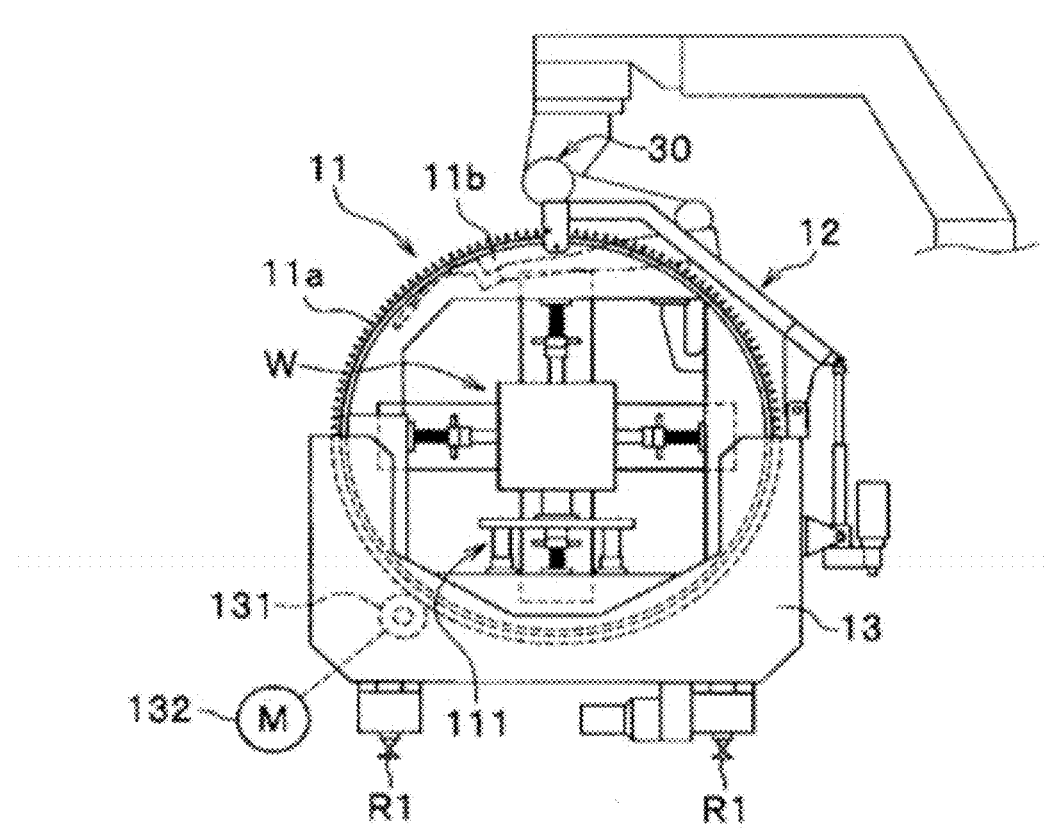
FIG. 3A is a schematic view for illustrating the configuration and the operation of the rotary positioner provided in the welding device according to the embodiment of the invention, the view showing a state in which the annular holding member has been stopped.

The bracket 13 receives the annular holding member 11 as shown in FIG. 1. The bracket 13 has a shape which receives the lower half of the annular holding member 11 therein and exposes the upper half of the annular holding member 11 therefrom, as shown in FIG. 2A. In addition, the pinion gear 131 and a driving member 132 are provided inside the bracket 13 as shown in FIG. 3A. The pinion gear 131 is disposed to engage with the gear 11a of the annular holding member 11. The driving member 132 drives the pinion gear 131. Incidentally, the driving member 132 may be provided in at least one of the pair of rotary positioners 10. The rotary positioners 10 may have a configuration in which one rotary positioner 10 follows rotation of the other rotary positioner 10.

The rail carriages 14 can move the rotary positioner 10 along positioner moving rails R1. The rail carriages 14 are provided to be paired under the rotary positioner 10 as shown in FIG. 1, so that the rotary positioner 10 can be moved in the longitudinal direction of the steel structure W.

Figure 3B:
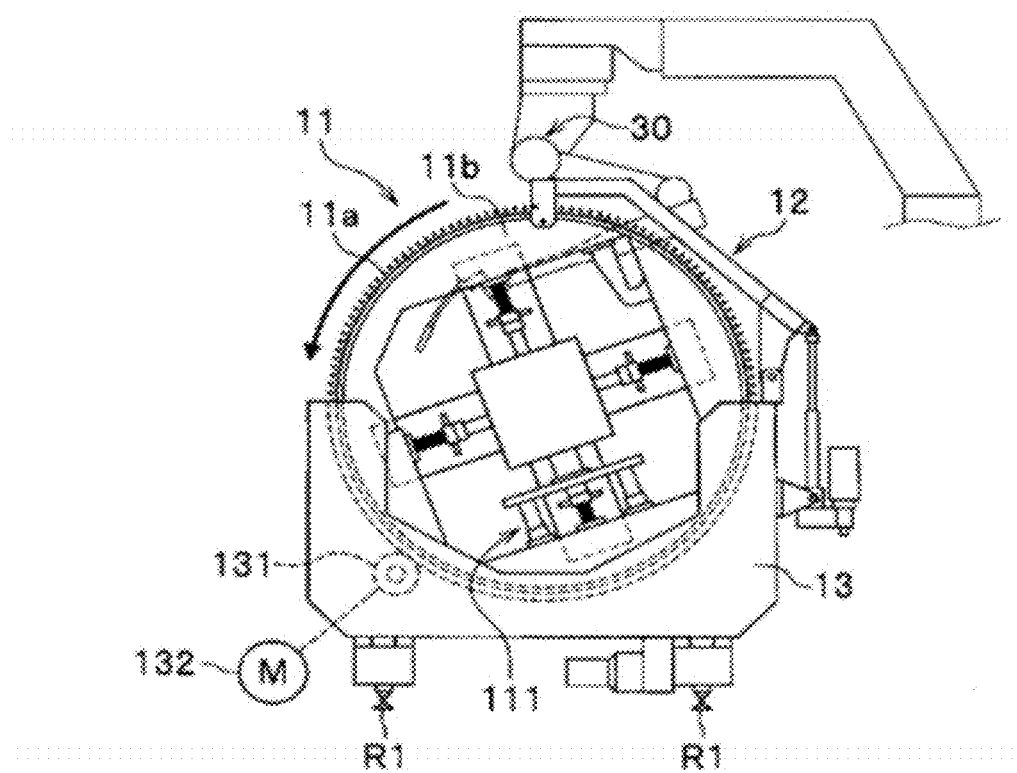
FIG. 3B is a schematic view for illustrating the configuration and the operation of the rotary positioner provided in the welding device according to the embodiment of the invention, the view showing a state in which the annular holding member has been rotated.

The rotary positioner 10 has a configuration in which the gear 11a formed in the outer circumference of the annular holding member 11 and the pinion gear 131 provided inside the bracket 13 can engage with each other as described previously (see FIG. 3A). Accordingly, when the annular holding member 11 is driven and rotated by the driving member 132 as shown in FIG. 3B, the rotary positioner 10 can rotate the steel structure W during welding work.

(Carriage)

The respective mechanisms constituting the welding device 1 are mounted on the carriage 20. The carriage 20 is formed into a flat plate-like shape as shown in FIG. 1. The welding robot 30, the wire supply vessel 40, the nozzle exchanging device 50, the nozzle cleaning device 60, the wire cutting device 80 and the welding control device 90 are mounted on the top of the carriage 20. In addition, a slag removing device mounting table 70a on which the slag removing device 70 is mounted (see FIG. 6), and a preheating torch mounting table 200a on which a preheating torch mechanism 201 (see FIG. 7) of the preheating device 200 is mounted are also mounted on the top of the carriage 20.

Wheels 21 are provided in a lower portion of the carriage 20. The carriage 20 is configured so that the carriage 20 can move along carriage moving rails R2 with the wheels 21. That is, the carriage 20 is provided moveably in the longitudinal direction of the steel structure W, corresponding to a direction parallel with the aforementioned moving direction of the rotary positioners 10.

A slider mechanism 22 is provided on the top of the carriage 20. The welding robot 30 is mounted on the top of the slider mechanism 22. The slider mechanism 22 is configured movably in a direction perpendicular to the moving direction of the rotary positioners 10, that is, the longitudinal direction of the steel structure W. Accordingly, the welding robot 30 mounted on the top of the slider mechanism 22 is configured movably in a direction perpendicular to the moving direction of the rotary positioners 10 during welding.

(Welding Robot)

The welding robot 30 welds the steel structure W. The welding robot 30 has a welding torch 31, which feeds a welding wire to an end of an arm, as shown in FIG. 1. The welding torch 31 is connected to a not-shown welding power supply so that electric power can be supplied to the welding wire through the welding torch 31. The welding robot 30 is mounted on the carriage 20 through the slider mechanism 22 so that the welding robot 30 can move in a direction perpendicular to the moving direction of the rotary positioners 10 (i.e., a width direction of the steel structure W), as described previously. In addition, the welding robot 30 is disposed between the pair of rotary positioners 10 or outside between the rotary positioners 10 so that the welding robot 30 can weld a welding joint between the pair of rotary positioners 10.

(Wire Supply Vessel)

The wire supply vessel 40 receives a welding wire to be supplied to the welding torch 31. The wire supply vessel 40 is formed into a cylindrical shape as shown in FIG. 1. The welding wire is received to be wound like a coil inside the wire supply vessel 40. The welding wire inside the wire supply vessel 40 is unwound for welding by a not-shown wire feeding device, passed through a wire extracting jig tapered and narrowed in an upper portion of the vessel, and supplied to the welding torch 31 through a not-shown conduit tube.

(Nozzle Exchanging Device)

The nozzle exchanging device 50 exchanges a nozzle for supplying a shielding gas. The nozzle is provided at the end of the welding torch 31. For example, when a welding joint with a deep groove is welded by the welding device 1, there is a case in which a short nozzle is used for welding a first layer or a second layer of the welding joint in order to prevent interference between the nozzle and the groove, and a long nozzle is used for welding subsequent layers in order to secure shieldability. In such a case, the nozzle exchanging device 50 is used so that the nozzle can be exchanged even on the way of welding. Thus, the exchanging work can be automated.

Figure 4:
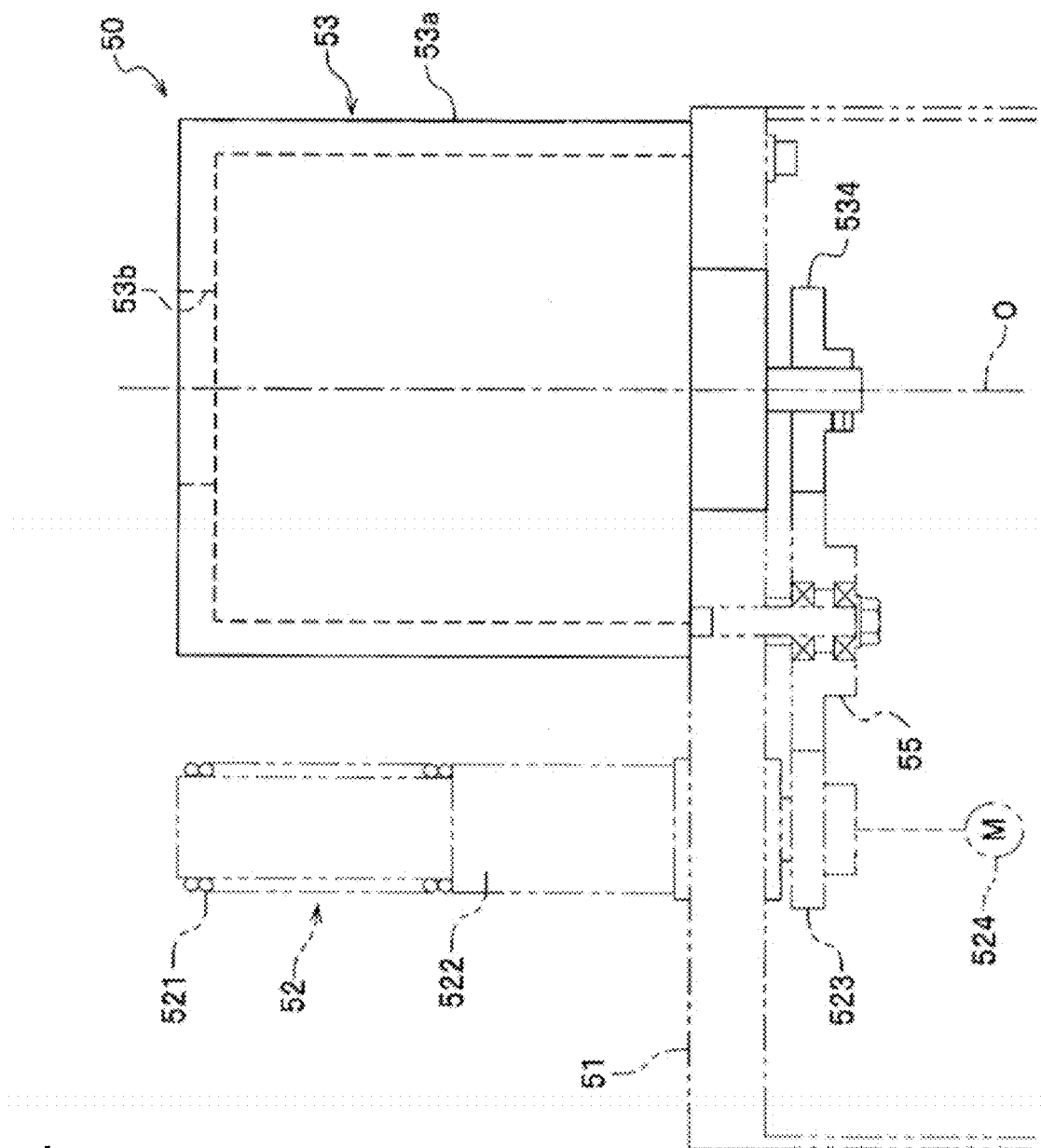
FIG. 4 is a sectional view showing a configuration of a nozzle exchanging device provided in the welding device according to the embodiment of the invention.

The nozzle exchanging device 50 is mounted near the welding robot 30 on the carriage 20 as shown in FIG. 1. Specifically as shown in FIG. 4, the nozzle exchanging device 50 has a cylindrical base 51, a cylindrical nozzle attaching/detaching mechanism 52 mounted on the base 51, a cylindrical chip cleaning mechanism 53 mounted on the base 51, and an intermediate gear 55 connecting the nozzle attaching/detaching mechanism 52 and the chip cleaning mechanism 53 with each other. Although not shown here, a plurality of such nozzle attaching/detaching mechanisms 52 are disposed on the base 51.

The nozzle attaching/detaching mechanism 52 attaches/detaches the nozzle at the end of the welding torch 31. As shown in FIG. 4, the nozzle attaching/detaching mechanism 52 has a coil spring 521 to which the nozzle can be inserted, a cylindrical member 522 which supports the coil spring, and a rotary drive source 524 which rotates the coil spring 521 positively or reversely through a spur gear 523. Incidentally, the spur gear 523 is connected to a spur gear 534 through the intermediate gear 55 as shown in FIG. 4. Accordingly, the nozzle exchanging device 50 is arranged so that when the spur gear 523 on the nozzle attaching/detaching mechanism 52 side is rotated, the torque thereof can be also transmitted to the spur gear 534 on the chip cleaning mechanism 53 side through the intermediate gear 55, as shown in FIG. 4.

Figure 5A:
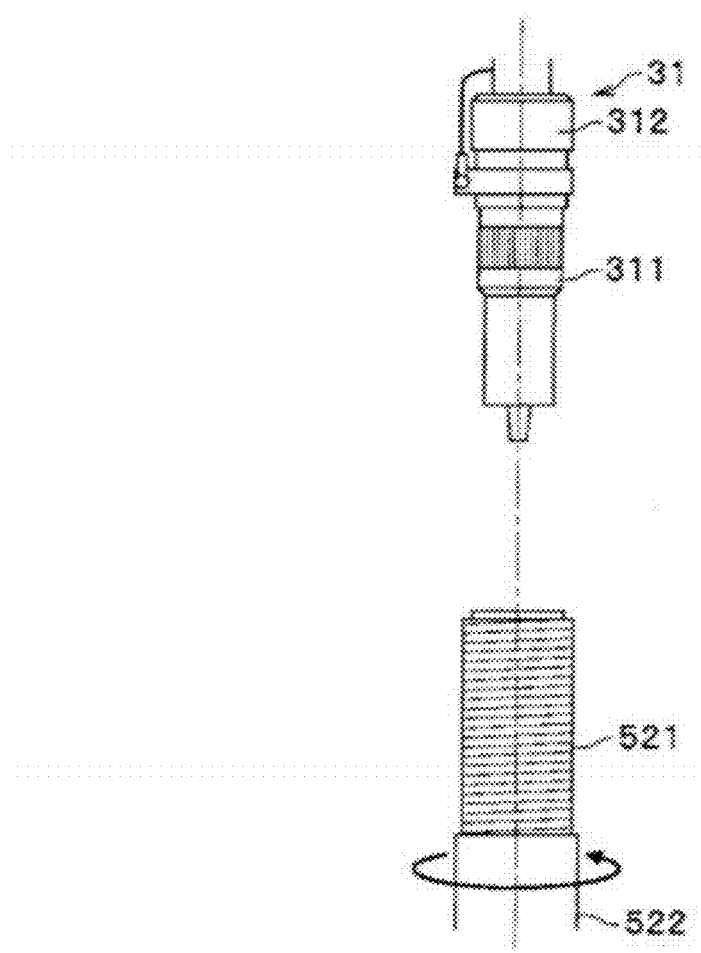
FIG. 5A is a view showing operation of a nozzle attaching/detaching mechanism of the nozzle exchanging device provided in the welding device according to the embodiment of the invention, the view showing a state in which a nozzle at an end of a welding torch has not been inserted into a coil spring of the nozzle attaching/detaching mechanism yet.
Figure 5B:
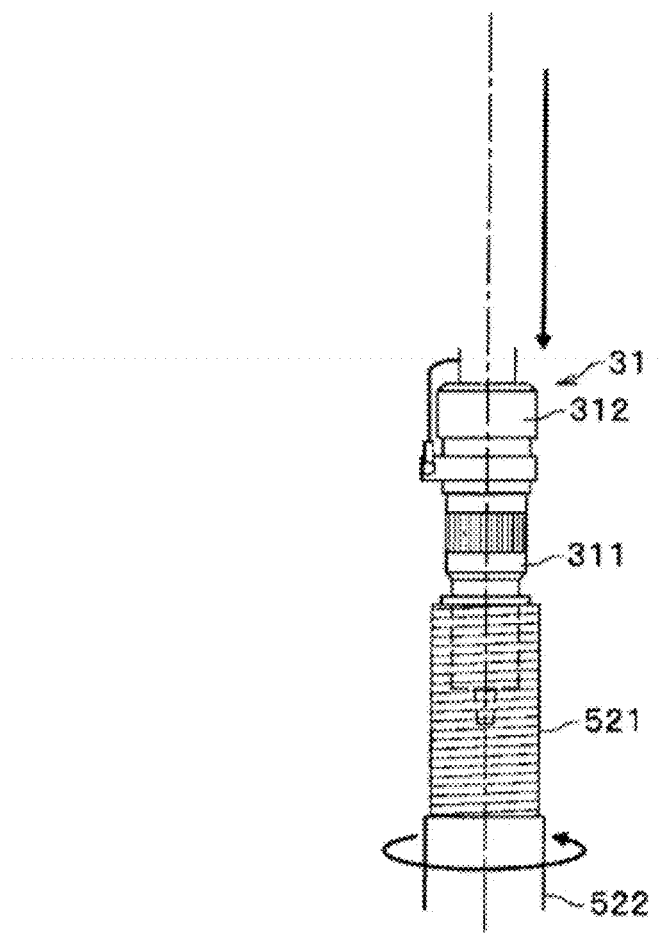
FIG. 5B is a view showing the operation of the nozzle attaching/detaching mechanism of the nozzle exchanging device provided in the welding device according to the embodiment of the invention, the view showing a state in which the nozzle at the end of the welding torch has been inserted into the coil spring of the nozzle attaching/detaching mechanism.
Figure 5C:
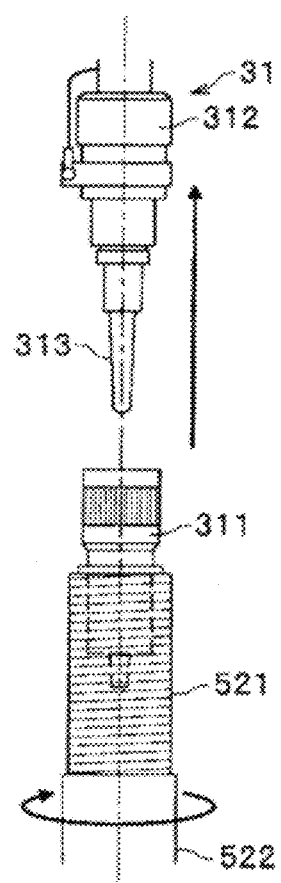
FIG. 5C is a view showing the operation of the nozzle attaching/detaching mechanism of the nozzle exchanging device provided in the welding device according to the embodiment of the invention, the view showing a state in which the nozzle at the end of the welding torch has been removed by the coil spring of the nozzle attaching/detaching mechanism.

The nozzle attaching/detaching mechanism 52 configured thus removes the nozzle from the welding torch 31, for example, in the following procedure. First, as shown in FIG. 5A, the nozzle attaching/detaching mechanism 52 uses the rotary drive source 524 to rotate the coil spring 521 in a direction in which the inner diameter of the spring becomes wider (counterclockwise here). Next, when the welding torch 31 descends to insert a nozzle 311 into the coil spring 521 as shown in FIG. 5B, the nozzle attaching/detaching mechanism 52 uses the rotary drive source 524 to rotate the coil spring 521 in a direction in which the inner diameter of the spring becomes narrower (clockwise here), as shown in FIG. 5C. As a result of this operation, the inner diameter of the coil spring 521 becomes so narrow that the nozzle 311 is fastened by the coil spring 521. Thus, when the welding torch 31 is lifted up, the nozzle attaching/detaching mechanism 52 can remove the nozzle 311 from a torch body 312 easily as shown in FIG. 5C. After the nozzle 311 is removed thus, a new nozzle 311 can be attached to the torch body 312 when the procedure shown in FIG. 5A to FIG. 5C is performed in reverse order.

The chip cleaning mechanism 53 cleans a chip 313 (see FIG. 5A to FIG. 5C) at the end of the welding torch 31 from which the nozzle 311 has been removed. That is, the nozzle exchanging device 50 is designed to clean the chip 313 at the end of the welding torch 31 after removing the nozzle 311 from the welding torch 31 by use of the nozzle attaching/detaching mechanism 52.

In the chip cleaning mechanism 53, as shown in FIG. 4, a through hole 53b to which the chip 313 (see FIG. 5C) at the end of the welding torch 31 can be inserted is formed on the upper portion of a cylindrical device body 53a. In addition, a plurality of brushes are disposed inside the device body 53a. Tension is applied to the brushes with springs toward the rotation center O so that the rotation radius of the brushes increase when a load is added thereto. To clean the chip, the nozzle 311 is removed, and the welding torch 31 equipped with the chip 313 and an orifice is lifted down and inserted into the through hole 53b from above the rotation center O, so as to remove spatters adhering to the chip 313 and the orifice.

Even if the nozzle 311 is inserted into the coil spring 521 so as to be deviated therefrom, the welding device 1 provided with the nozzle exchanging device 50 as described above can easily follow the deviation due to the deformation and flexibility of the coil spring 521. Thus, the nozzle 311 can be exchanged surely in spite of thermal deformation or a dimensional error in the nozzle 311.

(Nozzle Cleaning Device)

The nozzle cleaning device 60 cleans the nozzle 311 at the end of the welding torch 31. A through hole (not shown) to which the nozzle 311 of the welding torch 31 can be inserted is formed in an upper portion of the nozzle cleaning device 60 as shown in FIG. 1. The nozzle cleaning device 60 sprays shot balls onto the nozzle 311 which has been inserted into the through hole. Thus, ring-like spatters adhering to an end of the nozzle 311 are removed. The welding device 1 provided with the nozzle cleaning device 60 configured thus can prevent shieldability from deteriorating due to increase of spatters adhering to the nozzle 311.

(Slag Removing Device)

The slag removing device 70 removes slag generated in a weld portion when the steel structure W is welded by the welding robot 30. The slag removing device 70 may be either a type in which the slag removing device 70 is used to replace the welding torch 31 at the end of the welding robot 30 therewith or a type in which the slag removing device 70 is additionally mounted on the welding torch 31. In the following description, the type in which the slag removing device 70 is used to replace the welding torch 31 therewith will be explained.

Figure 6:
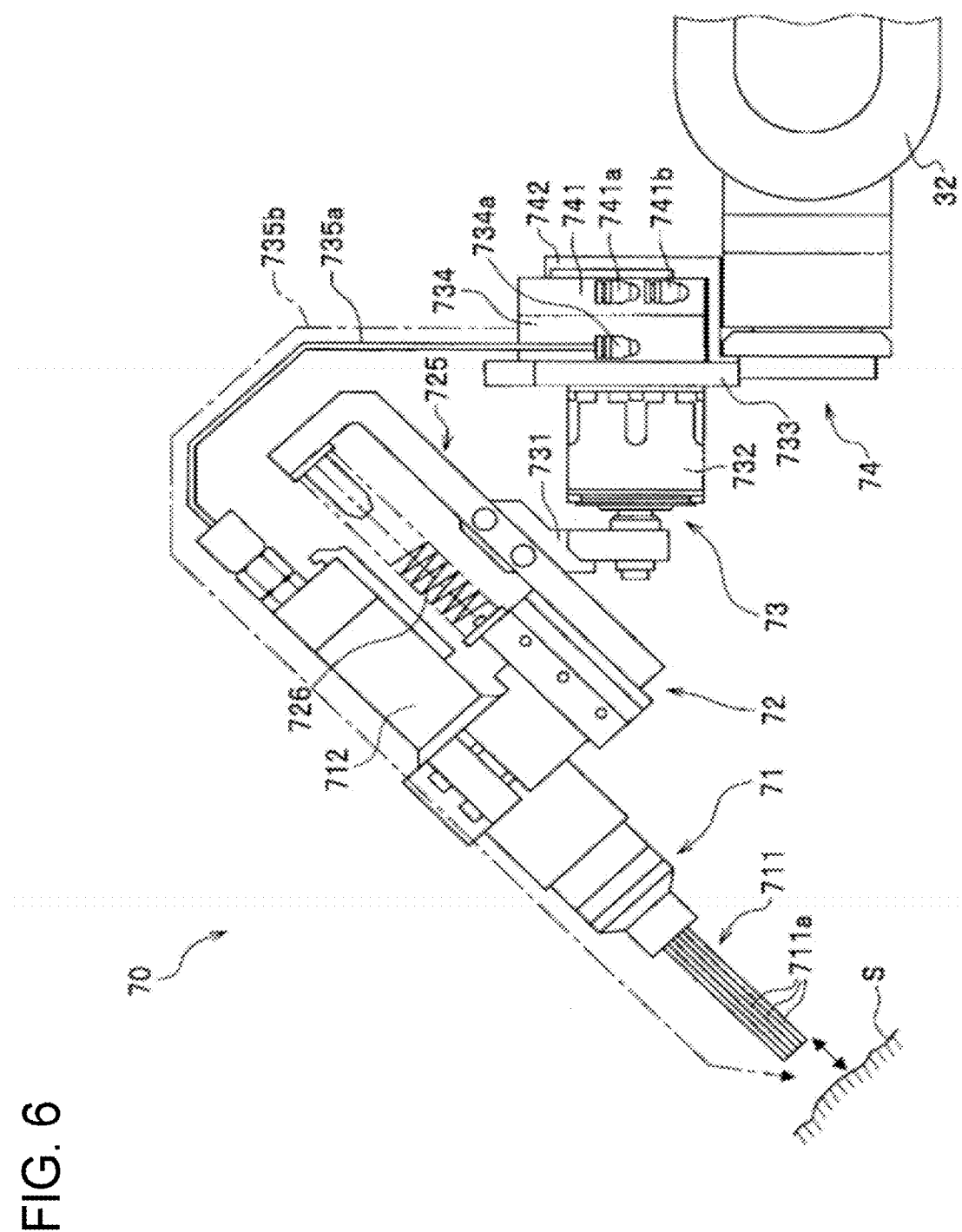
FIG. 6 is a side view showing a configuration of a slag removing device provided in the welding device according to the embodiment of the invention.

During welding, the slag removing device 70 is mounted on the slag removing device placing table 70a shown in FIG. 1 so that the welding torch 31 can be automatically replaced by the slag removing device 70 for each given pass prepared in advance during the welding. By the slag removing device 70 attached thus to the end of the welding robot 30, slag can be removed from the weld portion. Here as shown in FIG. 6, the slag removing device 70 has a chisel mechanism 71, a slide holding mechanism 72, a chisel-side attaching/detaching mechanism 73, and a robot-side attaching/detaching mechanism 74. In addition, the chisel mechanism 71, the slide holding mechanism 72, the chisel-side attaching/detaching mechanism 73, and the robot-side attaching/detaching mechanism 74 are removably attached to the slag removing device 70 as shown in FIG. 6.

The chisel mechanism 71 gives impact to the slag generated in the weld portion, to thereby remove the slag therefrom. As shown in FIG. 6, the chisel mechanism 71 has a needle assembly 711 in which a plurality of needles 711a each having, for example, a diameter of 3 mm are bundled, and a needle driver 712 which supplies chisel operating air to move the needle assembly 711 forward/backward, for example, at a rate of 4,000 times per minute while holding the needle assembly 711 to protrude a front portion thereof.

As shown in FIG. 6, a spring 726 has an axial direction coinciding with a needle moving direction. The spring 726 flexibly supports the needle driver 712 in the needle moving direction. That is, the spring 726 supports the needle driver 712 flexibly in the needle moving direction at a neutral position where there occurs no compressive force or no tensile force when the needle driver 712 has been positioned in a horizontal state. When the axial direction of the spring 726 is made to coincide with the needle moving direction, the spring 726 can attenuate impact force in the needle moving direction from the needle driver 712 efficiently to ⅒ or less due to elastic force composed of compressive force and elastic force caused by expansion and contraction of the spring 726.

Here, the spring constant of the spring 726 is preferably within a range of, for example, from 0.20 to 0.35 (kg/mm) when the weight of its operating portion is 3.3 kg.

The reason why the spring constant is set within the aforementioned range will be described. It is generally considered that the effect of attenuating vibration is higher as the spring 726 is made more flexible. However, the posture of the needle driver 712 changes in accordance with the position of a welding joint. When the spring 726 is too flexible, the weight applied to the spring 726 changes in accordance with a change in the posture of the needle driver 712, resulting in a large change in the position of the chisel end. In addition, in order to remove slag well, the needle driver 712 cannot give, to a bead and the slag, an impact force high enough to remove the slag unless the needle driver 712 is held by a holding force not lower than a predetermined one. Incidentally, the slide holding mechanism 72 may use a shock damper of another system in place of the spring 726 as long as it has an equivalent function to the spring 726.

The chisel-side attaching/detaching mechanism 73 can removably attach the chisel mechanism 71 and the slide holding mechanism 72 to the robot-side attaching/detaching mechanism 74. As shown in FIG. 6, one end of the chisel-side attaching/detaching mechanism 73 is connected to a slide support member 725 of the slide holding mechanism 72 while the other end is connected to a robot-side attaching/detaching member 741 of the robot-side attaching/detaching mechanism 74. As shown in FIG. 6, the chisel-side attaching/detaching mechanism 73 has a connection member 731 that is connected to a lower surface of the slide support member 725, a shock sensor 732 that is connected to the connection member 731 so as to detect impact force transmitted from the slide holding mechanism 72, a tool plate 733 that supports the shock sensor 732, and a tool-side attaching/detaching member 734 that is fixedly provided on the tool plate 733.

An air port 734a is formed in a side circumferential face of the tool-side attaching/detaching member 734 as shown in FIG. 6. The air port 734a is connected to the aforementioned needle driver 712 through a flexible first air duct 735a so as to supply chisel operating air to the needle driver 712, as shown in FIG. 6. In addition, a second air duct 735b as shown in FIG. 6 is connected to a not-shown air port in the side circumferential face of the tool-side attaching/detaching member 734. As shown in FIG. 6, the second air duct 735b has a configuration in which an open end of the second air duct 735b is disposed near an end portion of the needle assembly 711 so that blowing air can be sprayed from the open end toward the front of the end of the needle assembly 711 to thereby blow out slag from the surface of the weld portion.

In addition, the robot-side attaching/detaching member 741 is attachably/detachably connected to the tool-side attaching/detaching member 734 by attaching/detaching air as shown in FIG. 6. The tool-side attaching/detaching member 734 and the robot-side attaching/detaching member 741 are designed to be able to be electrically connected to each other to thereby transmit a shock detection signal from the aforementioned shock sensor 732, and to be able to form air paths through which the chisel operating air and the blowing air can be passed.

A first air port 741a and the second air port 741b are formed in the side circumferential face of the robot-side attaching/detaching member 741 as shown in FIG. 6, and a not-shown third air port is also formed therein. The first air port 741a communicates with the aforementioned air port 734a of the tool-side attaching/detaching member 734 through an air path. The first air port 741a is also connected to a not-shown chisel operating air supply device for supplying the chisel operating air when the slag is removed. On the other hand, the second air port 741b is connected to a not-shown attaching/detaching air supply device for supplying the attaching/detaching air when attaching/detaching operation is performed. Further, the third air port communicates with the second air duct 735b through an air path, and is also connected to a not-shown blowing air supply device for supplying the blowing air when the slag is removed. The aforementioned three kinds of air supply devices (not shown) may be constituted by on-off valves corresponding to three ports which are on-off controlled at predetermined timings, and a single air feeding device to which the on-off valves are connected.

Description has been made here, as shown in FIG. 6, about the slag removing device 70 having a configuration in which the shock sensor 732, the tool plate 733, the tool-side attaching/detaching member 734, the robot-side attaching/detaching member 741, and a bracket 742 are disposed in this order on the slide holding mechanism 72 so that the tool-side attaching/detaching member 734 and the robot-side attaching/detaching member 741 can be removably attached to each other. However, the layout of the respective constituents is not limited to that shown in FIG. 6. For example, the slag removing device 70 may have a configuration in which the tool-side attaching/detaching member 734, the robot-side attaching/detaching member 741, the tool plate 733, the shock sensor 732, and the bracket 742 are disposed in this order on the slide holding mechanism 72 through a bracket (not shown) or a base plate (not shown) similar to the tool plate 733 so that the tool-side attaching/detaching member 734 and the robot-side attaching/detaching member 741 can be removably attached to each other.

The slag removing device 70 configured thus is, for example, mounted on the slag removing device mounting table 70a shown in FIG. 1 when welding is performed using the welding torch 31. After a given pass prepared in advance has been terminated, the slag removing device 70 is attached to an arm portion end 32 of the welding robot 30 to remove the slag from the weld portion, as shown in FIG. 6. When the slag is being removed by the slag removing device 70, the welding torch 31 is mounted on the slag removing device mounting table 70a in place of the slag removing device 70.

Here, the welding pass where the slag is to be removed by the slag removing device 70 is inputted to the welding control device 90 as teaching data in advance. For example, assume that teaching data indicating that the slag is to be removed in the fifth pass has been inputted to the welding control device 90. In this case, when the welding control device 90 determines that a welding step in the fifth pass has been finished and the teaching data has an instruction to remove the slag, the welding control device 90 operates the welding robot 30 to move the welding torch 31 toward the aforementioned slag removing device mounting table 70a.

Next, the welding control device 90 mounts the welding torch 31 on the slag removing device mounting table 70a, releases the tool-side attaching/detaching member 734 and the robot-side attaching/detaching member 741 from connection with each other, and detaches the welding torch 31 from the arm portion end 32 of the welding robot 30. Next, the welding control device 90 mounts the slag removing device 70, which has been mounted on the slag removing device mounting table 70*a*, on the arm portion end 32 of the welding robot 30. When the welding torch 31 is replaced by the slag removing device 70 in this manner, the welding control device 90 subsequently makes up teaching data for removing slag, and removes the slag from the weld portion based on the teaching data for removing the slag.

In the case where the aforementioned slag removing device 70 is not used to replace the welding torch 31 but additionally mounted on the welding torch 31, for example, a tool attaching/detaching member for clamping a chisel may be provided near the welding torch 31, or a mounting unit for clamping the slag removing device 70 by means of an air expansion type clamping mechanism or the like may be provided. After the given welding pass has been terminated, the slag removing device 70 may be arranged to be additionally mounted on the mounting unit of the welding torch 31 so as to remove the slag.

The welding device 1 having the slag removing device 70 as described above can remove the slag generated in the weld portion. Thus, welding failure or welding defects can be prevented.

(Wire Cutting Device)

The wire cutting device 80 cuts off the welding wire. The welding robot 30 performs sensing (in three directions, such as gap sensing) using the welding wire in order to detect a welding position or a position of the steel structure W, as will be described later. However, when slag adheres to the end of the welding wire, electric conductivity for sensing may deteriorate so that the position cannot be accurately detected. Therefore, the welding device 1 uses the wire cutting device 80 to cut the end of the welding wire to thereby remove the slag therefrom and increase the sensing accuracy.

The wire cutting device 80 is disposed on the carriage 20 and at a height the welding torch 31 can reach easily, as shown in FIG. 1. The wire cutting device 80, for example, has a plurality of cutters for cutting the welding wire. Edges of the cutters are, for example, driven by air so that the welding wire can be cut by crossing the edges with each other.

(Preheating Device)

Figure 7:
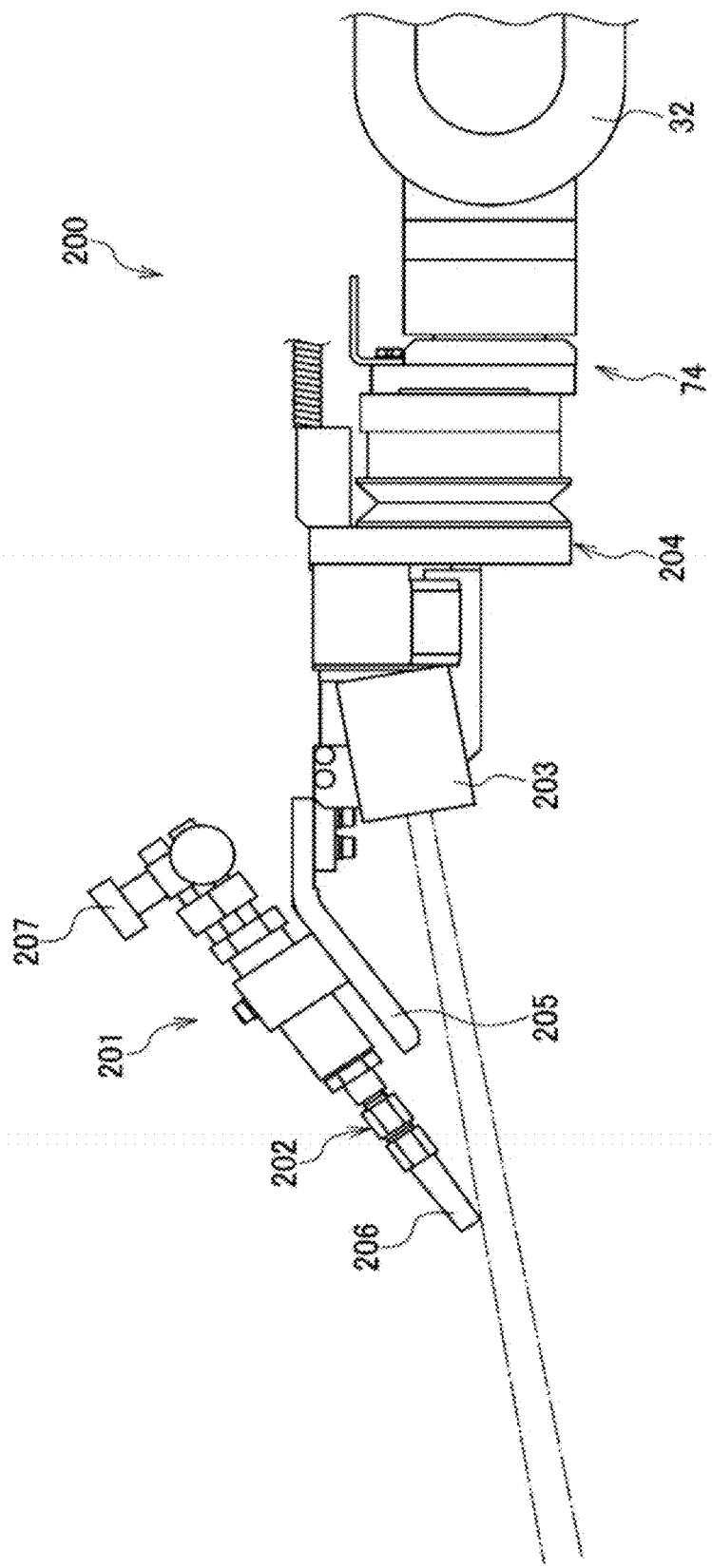
FIG. 7 is a side view showing a preheating device provided in the welding device according to the embodiment of the invention.

The preheating device 200 preheats the weld portion of the steel structure W to a set preheating temperature prior to welding. The preheating device 200 has a preheating torch mechanism 201. The preheating device 200 may be either a type in which the preheating device 200 is used to replace the welding torch 31 at the arm portion end 32 of the welding robot 30 therewith as shown in FIG. 7, a type in which the preheating device 200 is provided in use on a special carriage (see FIG. 13), or a type in which a special welding robot (not shown) to which the preheating torch mechanism 201 can be attached is additionally provided. In the following description, the type in which the preheating device 200 is used to replace the welding torch 31 therewith will be explained.

During welding, the preheating torch mechanism 201 is mounted on a preheating torch placing table 200*a* shown in FIG. 1 so that the preheating torch mechanism 201 can be automatically attached to the end of the welding robot 30 in place the welding torch 31 so as to preheat the weld portion. As shown in FIG. 7, the preheating torch mechanism 201 includes a preheating torch 202, a non-contact temperature sensor 203, a preheating-torch-side attaching/detaching mechanism 204, and the robot-side attaching/detaching mechanism 74. In the preheating torch mechanism 201, the preheating torch 202, the temperature sensor 203 and the preheating-torch-side attaching/detaching mechanism 204 are provided to be removably attached to the robot-side attaching/detaching mechanism 74.

As shown in FIG. 7, the preheating-torch-side attaching/detaching mechanism 204 is connected to a preheating torching support portion 205 on one side, and connected to the robot-side attaching/detaching mechanism 74 by attaching/detaching air on the other side. The preheating torch 202 and the temperature sensor 203 are disposed on the preheating torch support portion 205. A burner 206 for injecting flame to preheat the weld portion of the steel structure W is provided at an end of the preheating torch 202, and a gas supply port 207 for supplying combustion gas from a not-shown gas supply source to the burner 206 is provided at a rear end of the preheating torch 202.

The temperature sensor 203 measures a temperature of the weld portion heated by the preheating torch 202 in a non-contact manner. The range in which the temperature sensor 203 can measure the temperature is shown by the broken line in FIG. 7. A position to be preheated is specified by a laser pointer, and the temperature of the weld portion at an end portion of the burner 206, that is, at a point heated by the flame from the burner 206 is measured. The temperature sensor may be either a contact type one or a non-contact type one. Preferably the temperature sensor is a non-contact type temperature sensor such as a radiation thermometer. Alternatively the temperature sensor may be a visual sensor such as a thermograph. More preferably such a temperature sensor is used in combination with a position sensor such as a laser pointer.

The preheating torch 202 attached to the end of the welding robot 30 can preheat the weld portion to a variety of temperatures set in accordance with the dimensions of the workpiece, the plate thickness or the joint shape, prior to welding, based on preheat conditions provided by a welding control device 90 described below. Accordingly, the preheating device 200 can automate the preheating work while preventing weld cracking.

(Welding Control Device)

Figure 8:
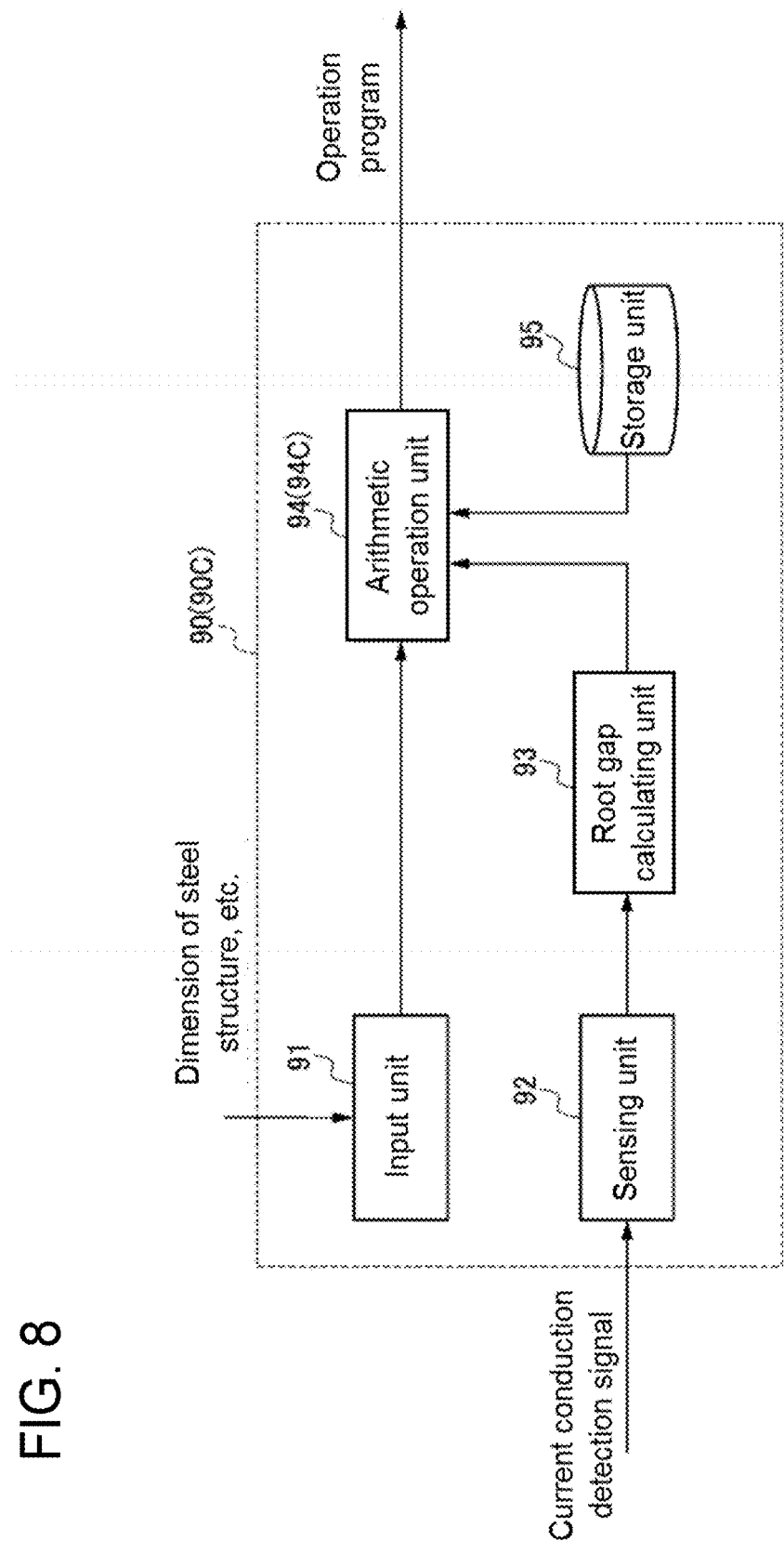
FIG. 8 is a block diagram showing a configuration of a welding control device provided in a welding device according to a first embodiment and a fourth embodiment of the invention.

The welding control device 90 controls operations of the rotary positioners 10, the carriage 20, the welding robot 30, the nozzle exchanging device 50, the nozzle cleaning device 60, the slag removing device 70, the wire cutting device 80, and the preheating device 200. Here as shown in FIG. 8, the welding control device 90 has an input unit 91, a sensing unit 92, a root gap calculating unit 93, an arithmetic operation unit 94, and a storage unit 95. Of the units belonging to the welding control device 90, the units for controlling the operations of the welding robot 30 and the preheating device 200 will be mainly described below. Description about the units for controlling the operations of the other devices (the rotary positioners 10, the carriage 20, the nozzle exchanging device 50, the nozzle cleaning device 60, the slag removing device 70 and the wire cutting device 80) will be omitted.

Information about the workpiece (hereinafter referred to as the steel structure W) and the welding joint, and preheating information are inputted to the input unit 91. Here, the dimensions of the steel structure W and/or the shape of the welding joint, information about propriety of welding execution, and if necessary a set preheating temperature are inputted to the input unit 91 through input by a worker or through input of CAD data of the steel structure W. As shown in FIG. 8, the input unit 91 outputs the inputted information to the arithmetic operation unit 94. Incidentally, for example, a root gap of the steel structure W, position coordinates of the steel structure W, etc. may be inputted to the input unit 91 through the input by the worker or through the input of the CAD data of the steel structure W.

The sensing unit 92 detects the position coordinates of the steel structure W. Specifically the sensing unit 92 applies a sensing voltage between the welding torch 31 supporting the welding wire set with a predetermined extension and the steel structure W, so as to detect a current conduction state based on contact between the welding wire and the steel structure W to thereby detect the position of the steel structure W. More specifically in the sensing unit 92, a current conduction detection signal generated on contact with the steel structure W is inputted from the welding torch 31 performing the sensing (touch sensing), and the position coordinates of the steel structure W are detected based on the current conduction detection signal.

An example of the procedure of the sensing by the welding torch 31 will be described below. The example will be described below in the case where the steel structure W is constituted by a steel structure part (column) W1 and a steel structure part (diaphragm) W2, an L-shaped groove is formed between the two parts, and a backing member BM is disposed on a bottom portion of the groove.

First, in a first step of the procedure, the welding torch 31 supporting the welding wire having the predetermined extension is positioned at a sensing start position $P_S$, and a sensing voltage is applied between the welding wire and each of the steel structure parts W1 and W2. Incidentally, the sensing start position $P_S$ is set in advance at a position separated from a detection start position $P_1$ where detection of a surface W1b of the steel structure part W1 is to be started, to the groove side by a distance A in parallel to the surface W1b.

Next, in a second step of the procedure, the welding torch 31 is moved in a −Y direction from the sensing start position $P_S$ to the detection start position $P_1$ where detection of the surface W1b of the steel structure part W1 is to be started. Next, in a third step of the procedure, the welding torch 31 is moved in a +X direction from the detection start position $P_1$ to a position $P_2$. Then the welding wire is brought into contact with the surface W1b of the steel structure part W1, and a current conduction detection signal generated thereby is outputted from the welding torch 31 to the sensing unit 92. Thus, the sensing unit 92 detects the position coordinates of the position $P_2$ of the surface W1b of the steel structure part W1.

Next, in a fourth step of the procedure, the welding torch 31 is moved from the position $P_2$ to a position $P_3$ returned in the −X direction by a predetermined distance b (for example, 2 mm) prepared in advance. Next, in a fifth step of the procedure, the welding torch 31 is moved in a +Y direction from the position $P_3$ to a position $P_4$. Next, in a sixth step of the procedure, the welding torch 31 is moved from the position $P_4$ to a position $P_5$ by a predetermined distance D in the +X direction. As the distance D, a distance set by arithmetic operation based on a distance ratio of a groove depth C set in advance from the groove depth C and the return distance b after the detection of the surface W1b of the steel structure part W1 may be used.

Next, in a seventh step of the procedure, the welding torch 31 is moved in the +Y direction from the position $P_5$ to a position $P_6$. Then the welding wire is brought into contact with the position $P_6$ of a groove face W2a of the steel structure part W2, and a current conduction detection signal generated thereby is outputted from the welding torch 31 to the sensing unit 92. Thus, the sensing unit 92 detects the position coordinates of the position $P_6$ of the groove face W2a. Next, in an eighth step of the procedure, the welding torch 31 is moved from the position $P_6$ to a position $P_7$ in the −Y direction. Then the welding wire is brought into contact with the position $P_7$ of a groove face W1a of the steel structure part W1, and a current conduction detection signal thereof is outputted from the welding torch 31 to the sensing unit 92. Thus, the sensing unit 92 detects the position coordinates of the position $P_7$ of the groove face W1a.

Next, in a ninth step of the procedure, the welding torch 31 is moved from the position $P_7$ to a position $P_8$ in the +Y direction. Incidentally, the position $P_8$ is a central position of the groove width between the position $P_6$ of the groove face W1a and the position $P_7$ of the groove face W2a. The position $P_8$ is calculated by a not-shown groove width central position calculating unit, and inputted to the welding robot 30. After those positions are sensed by the welding torch 31, the sensing unit 92 outputs the calculated position coordinates of the positions $P_2$, $P_6$ and $P_7$ to the root gap calculating unit 93 as shown in FIG. 8.

Figure 9:
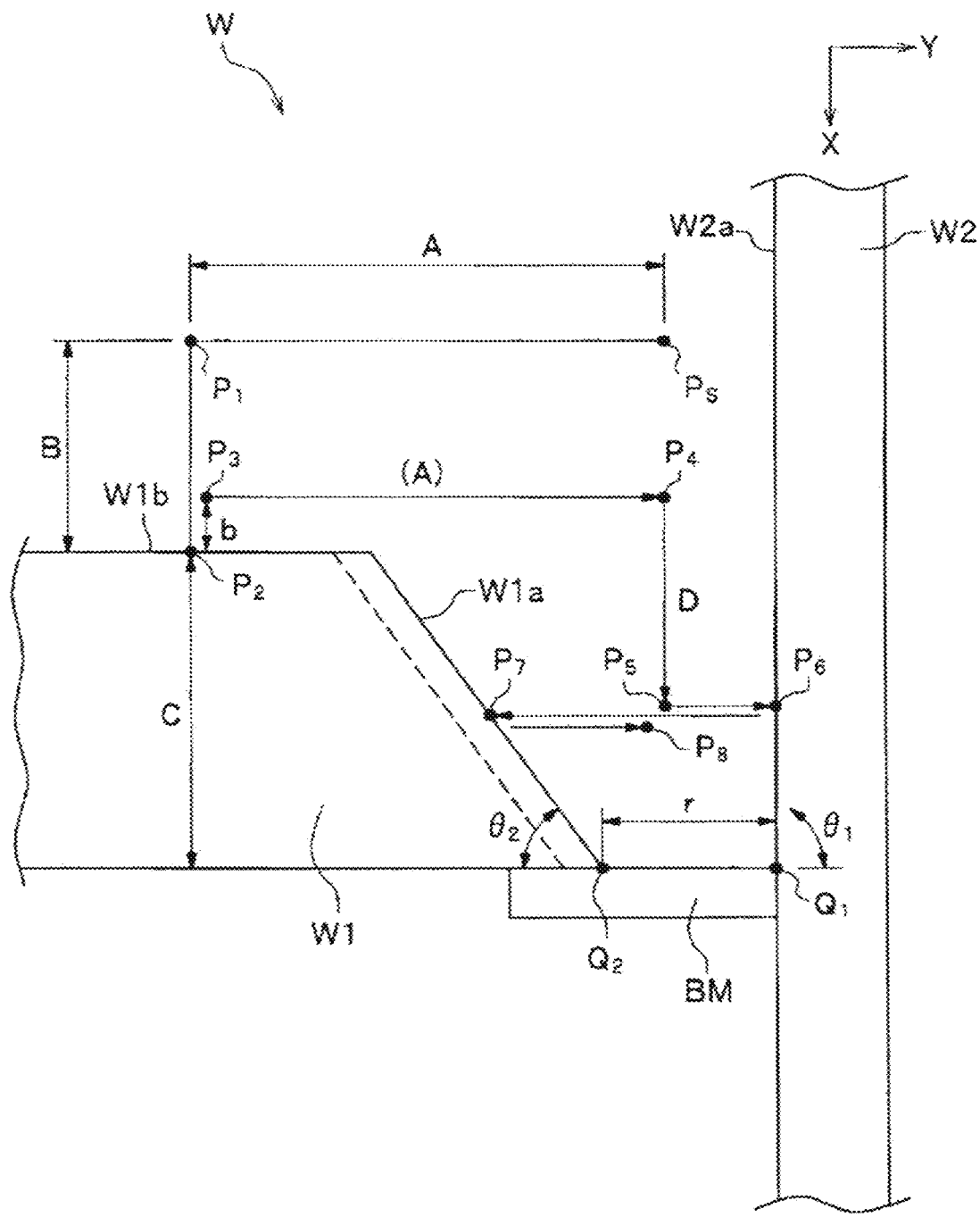
FIG. 9 is a schematic view showing a procedure of gap sensing by the welding device according to each embodiment of the invention.

The root gap calculating unit 93 calculates a root gap of the groove. For example, in the example of FIG. 9, the root gap calculating unit 93 calculates the root gap based on the detected position data of the groove faces W1a and W2a detected by the sensing unit 92, that is, the position coordinates of the positions $P_6$ and $P_7$, the difference between the set groove depth C and the detection start position $P_1$, and angles θ1 and θ2 of the groove faces W1a and W2a set in advance. That is, the root gap calculating unit 93 calculates a groove root position $Q_1$ from the position coordinates of the position $P_6$ and the angle θ1 (90 degrees here) of the groove face W1a as shown in FIG. 9. In addition, the root gap calculating unit 93 calculates a groove root position $Q_2$ from the position coordinates of the position $P_7$ and the angle θ2 of the groove face W2a as shown in FIG. 9. The root gap calculating unit 93 calculates a distance r between the groove root position $Q_1$ and the groove root position $Q_2$ as a root gap, and outputs the root gap to the arithmetic operation unit 94.

Figure 10:
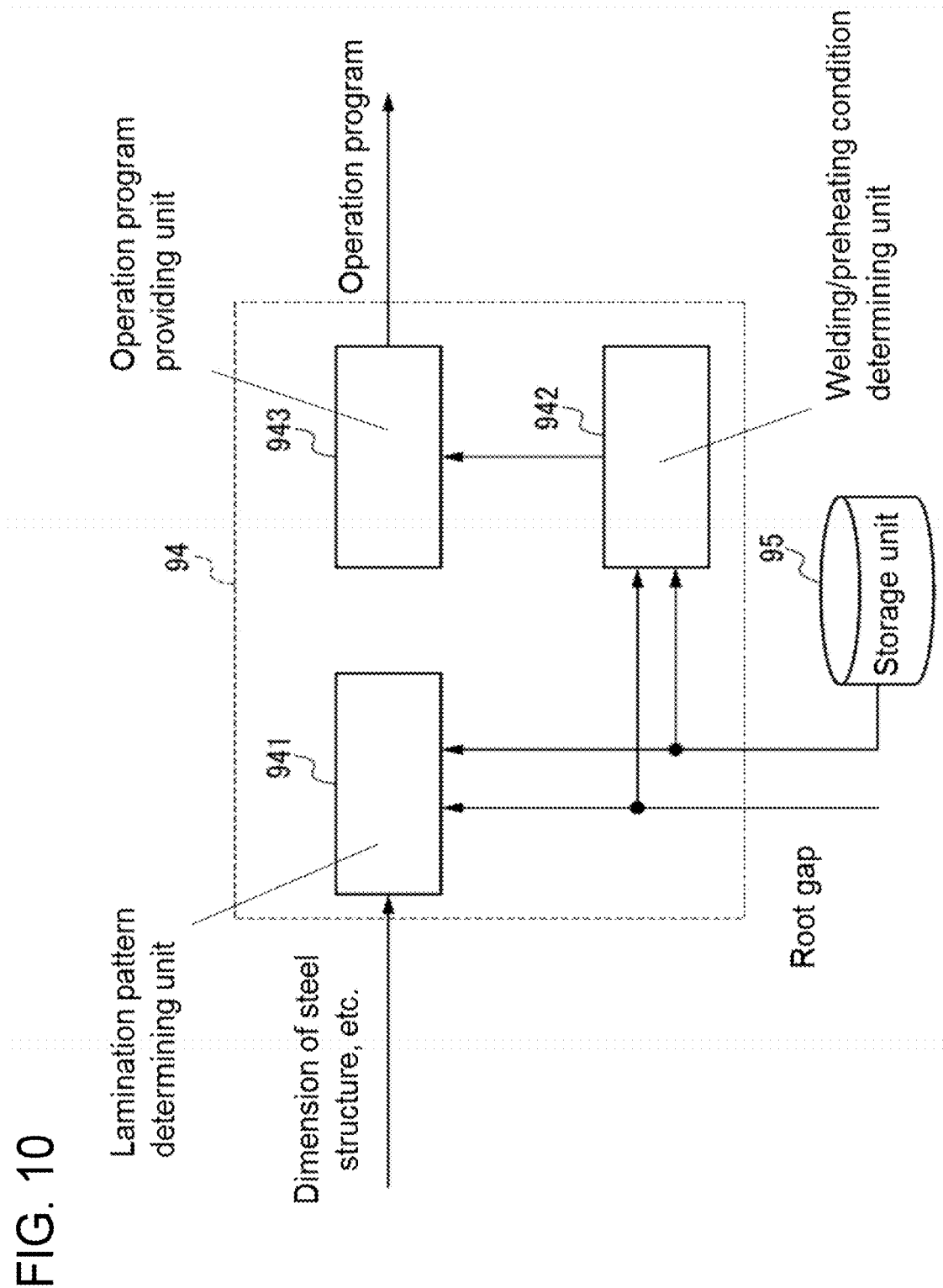
FIG. 10 is a block diagram showing a configuration of an arithmetic operation unit of the welding control device provided in the welding device according to the embodiment of the invention.

The arithmetic operation unit 94 automatically generates a lamination pattern, a welding robot operation orbit, welding conditions, and preheating conditions for a welding joint to be welded. Here as shown in FIG. 10, the arithmetic operation unit 94 has a lamination pattern determining unit 941, a welding/preheating condition determining unit 942, and an operation program providing unit 943.

The lamination pattern determining unit 941 determines a lamination pattern for a welding joint to be welded. Specifically the lamination pattern determining unit 941 selects and determines a lamination pattern corresponding to the welding joint to be welded, from a lamination pattern database stored in advance in the storage unit 95 based on dimensions (for example, plate thickness) of the steel structure W inputted correspondingly to the welding joint to be welded, or based on the dimensions and a root gap of the steel structure W. That is, in the storage unit 95, a lamination pattern has been stored as a database for each dimension of the steel structure W, or for each dimension and each root gap of the steel structure W. The lamination pattern determining unit 941 determines an optimum lamination pattern with reference to the database. Incidentally, the root gap used by the lamination pattern determining unit 941 may be a root gap of the steel structure W inputted through the input unit 91 by a worker, or a root gap of the steel structure W determined by sensing, that is, a root gap determined through the sensing unit 92 and the root gap calculating unit 93.

The welding/preheating condition determining unit 942 determines the welding conditions and the preheating conditions for the welding joint to be welded. Specifically the welding/preheating condition determining unit 942 selects and determines welding conditions and preheating conditions corresponding to the welding joint to be welded, from a database of welding condition data and preheating condition data stored in advance in the storage unit 95, based on dimensions (for example, plate thickness) of the steel structure W inputted correspondingly to the welding joint to be welded, or the dimensions and a root gap of the steel structure W, and based on preheating information. That is, in the storage unit 95, welding condition data and preheating condition data have been stored as a database for each dimension of the steel structure W or for each dimension and each root gap of the steel structure W. With reference to the database, the welding/preheating condition determining unit 942 determines optimum welding conditions and preheating conditions. The root gap used by the welding/preheating condition determining unit 942 may be a root gap of the steel structure W inputted through the input unit 91 by a worker, or a root gap of the steel structure W determined by sensing, that is, a root gap determined through the sensing unit 92 and the root gap calculating unit 93.

The operation program providing unit 943 provides an operation program of the welding robot 30. Specifically the operation program providing unit 943 provides a robot operation program including an operation orbit of the welding robot 30 in accordance with the lamination pattern determined by the lamination pattern determining unit 941, and the welding conditions determined by the welding/preheating condition determining unit 942, and outputs the robot operation program to the welding robot 30 so as to set the robot operation program therein. That is, the operation program providing unit 943 provides a program for teaching a procedure required for welding in each pass of the welding joint to be welded before the welding robot 30 executes a final welding process. In addition, welding robot operation orbit teaching data may be made up as master data in advance in the storage unit 95 through input by a worker or through input of CAD data of the steel structure W. An operation program is provided to correct a teaching program of a procedure required for welding in each path of the welding joint to be welded, in accordance with the inputted dimensions (such as plate thickness) of the steel structure W or the dimensions and the root gap of the steel structure W, the lamination pattern determined by the lamination pattern determining unit 941, and the welding conditions determined by the welding/preheating condition determining unit 942. This teaching program includes, as the welding conditions for the welding joint to be welded, information about a welding current, a welding voltage, a welding speed, an extension of the welding torch 31, a current value corresponding to a wire feeding rate, etc., or information about heat input conditions, an inter-pass temperature, an operation orbit of the welding robot 30, an arc ON position, a final welding start position, a crater forming position, a start position of seam processing, etc.

In addition, a preheating main program, an ignition program, and a preheating sub-program may be prepared in advance for the operation program providing unit 943. The preheating main program describes instruction codes for calling the ignition program and the preheating sub-program. In addition, after preheating is completed, the preheating main program executes confirmation of a preheating temperature by the temperature sensor 203. The ignition program called by the preheating main program uses an ignition device to ignite the preheating torch 202, and then performs work of confirming the ignition. On the other hand, the preheating sub-program automatically provides a heating temperature, a heating time, etc. of the preheating device 200 for the welding joint to be welded, and uses the preheating device 200 to preheat the weld portion to a set preheating temperature.

Figure 12A:
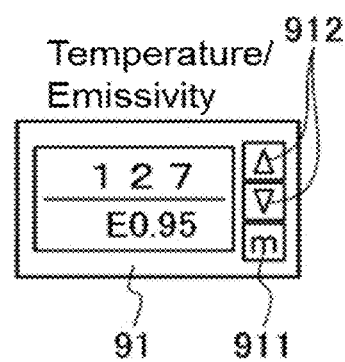
FIG. 12A is a view showing a temperature setting panel of the preheating device.
Figure 12B:
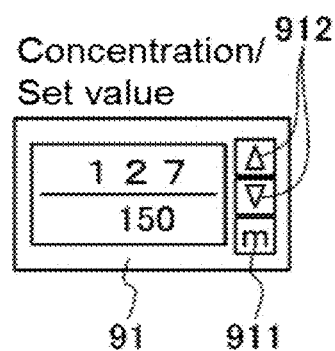
FIG. 12B is a view showing the temperature setting panel of the preheating device.

Here, when a temperature adjustment of the weld portion by the preheating device 200 is inputted as preheating information, it is preferable that the preheating temperature is manually input and set to the input unit 91 of the welding control device 90, as shown in FIG. 12A and FIG. 12B. Specifically, a mode key 911 of the input unit 91 is operated to change over a mode to display a current temperature of the weld portion in an upper stage of a display portion, and to display emissivity in a lower stage of the display portion (see FIG. 12A). Further, the mode key 911 is operated to change over the mode to a temperature/setting mode, and then an arrow key 912 is operated to set a set preheating temperature (150° C. in FIG. 12B) (see FIG. 12B). In addition to the processes of FIG. 12A and FIG. 12B, an item of setting for irradiating a temperature measuring position of the weld portion with laser may be added in order to make the temperature measuring position clearer, by changing over to a laser light projection setting mode.

The storage unit 95 stores a lamination pattern, welding condition data, heat input condition data and preheating condition data for each dimension of the steel structure W or for each dimension and each root gap of the steel structure W. Specifically, the storage unit 95 is implemented by a memory, a hard disk, etc. that can store data. Incidentally, here as shown in FIG. 8, the storage unit 95 is provided inside the welding control device 90. However, the storage unit 95 may be provided outside the welding control device 90.

Preferably the welding device 1 configured thus can make the storage unit 95 store heat input condition data and inter-pass temperature data as information of the database in addition to the operation orbit data of the welding robot 30, the preheating condition data and the welding condition data based on information such as the dimensions of the steel structure W inputted to the input unit 91 of the welding control device 90, and can automatically provide heat input conditions and inter-pass temperature conditions. Thus, according to the welding device 1, preheating work and welding work can be automated without individually providing teaching data such as the operation orbit, the welding conditions, the preheating conditions, etc., and heat input or an inter-pass temperature can be managed easily. Thus, the welding work can be optimized.

Particularly preheating conditions of a large-size workpiece differ in accordance with the dimensions of the workpiece, a plate thickness or a shape of a joint. Therefore, in the background art, data of preheating conditions are provided individually for each weld place, and the weld place is preheated on the preheating conditions. However, according to the welding control device 90 in this embodiment, the preheating work can be automated to improve the workability.

In addition, when the steel structure W is held by the pair of rotary positioners 10 and a straight part of the steel structure W is, for example, welded by the welding robot 30, the welding device 1 can weld the straight part by the welding robot 30 without rotating the steel structure W. When an arc part (i.e., corner portion) of the steel structure W is welded by the welding robot 30, the welding device 1 can weld the arc part by the welding robot 30 while rotating the steel structure W. Thus, the welding device 1 can weld not only the straight part of the steel structure W but also the arc part thereof continuously without disconnecting an arc for welding.

In addition, according to the welding device 1, the position of the steel structure can be detected by the sensing unit 92, and the root gap can be calculated in accordance with the position of the steel structure W by the root gap calculating unit 93. It is therefore unnecessary to detect a position of a bottom surface of the groove, and it is possible to determine the root gap, for example, regardless of irregularities generated by temporary welding on a backing member BM or adhesion of a slag by the temporary welding.

In addition, the welding device 1 can automatically provide a lamination pattern, welding conditions and preheating conditions for a welding joint to be welded, in accordance with dimensions of the steel structure W or in accordance with the dimensions and a root gap of the steel structure W.

(Processing Procedure of First Embodiment)

Figure 11:
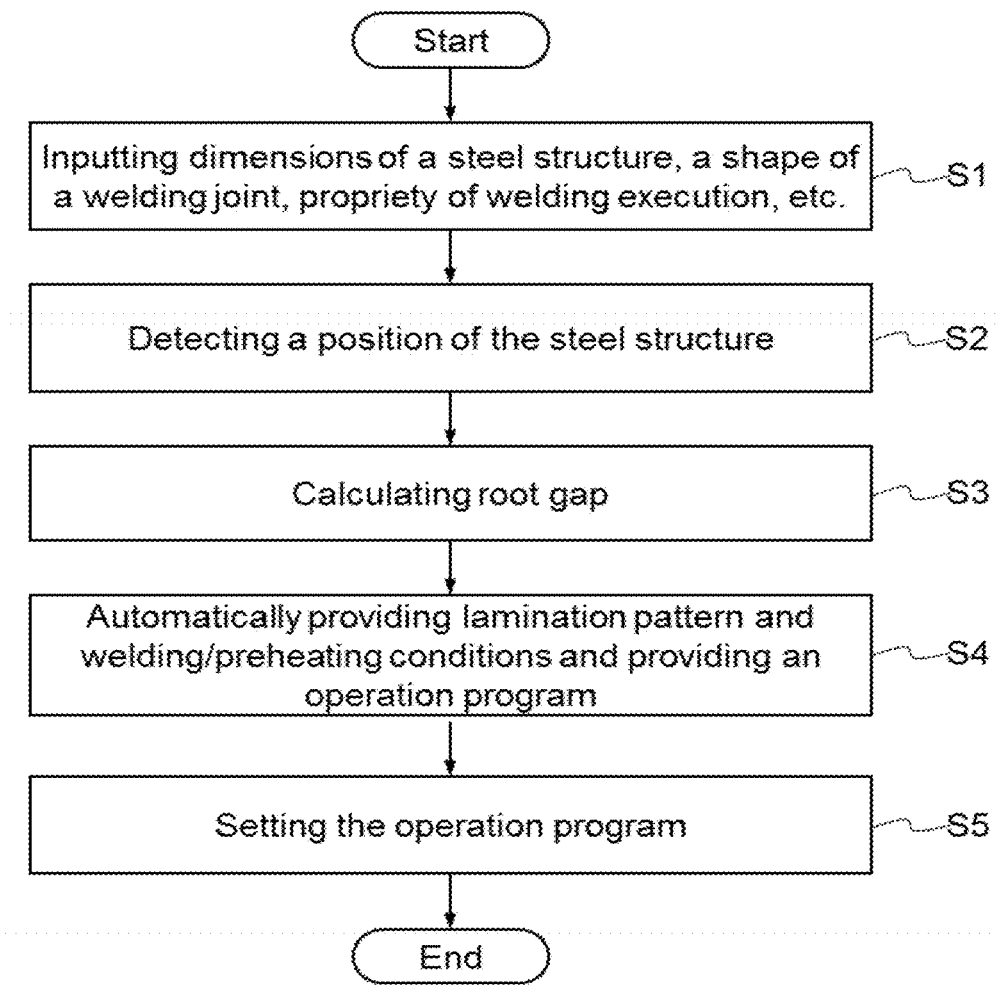
FIG. 11 is a flow chart showing a processing procedure of the welding control unit provided in the welding device according to the first embodiment of the invention.

A processing procedure of the welding control device 90 provided in the welding device 1 according to the first embodiment will be described below with reference to FIG. 11 (also see FIG. 8 to FIG. 10 if necessary). First, in the welding control device 90, dimensions of the steel structure W or the shape of the welding joint or both of them, and information about propriety of welding execution are inputted to the input unit 91 through input by a worker or through input of CAD data of the steel structure W (Step S1).

Next, the welding control device 90 uses the sensing unit 92 to detect the position of the steel structure W (Step S2). Next, the welding control device 90 uses the root gap calculating unit 93 to calculate a root gap based on the position coordinates of the positions $P_6$ and $P_7$ of the groove faces W1$a$ and W2$a$ detected by the sensing unit 92, the difference between the set groove depth C and the detection start position $P_1$, and the angles $\theta 1$ and $\theta 2$ of the groove faces W1$a$ and W2$a$ set in advance (Step S3).

Next, based on the dimensions of the steel structure W or the shape of the welding joint or both of them, and the preheating information, and in accordance with the welding robot operation orbit teaching data, the welding condition data and the preheating condition data stored in advance in the storage unit 95, the welding control device 90 uses the arithmetic operation unit 94 to automatically provide a lamination pattern, welding conditions and preheating conditions for the welding joint to be welded, and to produce an operation program (Step S4). Then the welding control device 90 outputs the operation program (i.e., welding robot operation orbit) provided by the arithmetic operation unit 94 to the welding robot 30 and the preheating device 200, and sets the operation program therein (Step S5). After the weld portion is preheated through the aforementioned processing procedure by the preheating device 200, welding by the welding robot 30 is started.

When the lamination pattern, the welding robot operation orbit, the welding conditions and the preheating conditions for the welding joint to be welded are automatically provided by the arithmetic operation unit 94, the welding robot operation orbit teaching data (i.e., master data) are not stored in the storage unit 95 or not used, but may be calculated directly in accordance with the dimensions of the steel structure W or the shape of the welding joint or both of them, and the preheating information.

(Modification of Preheating Device)

Figure 13:
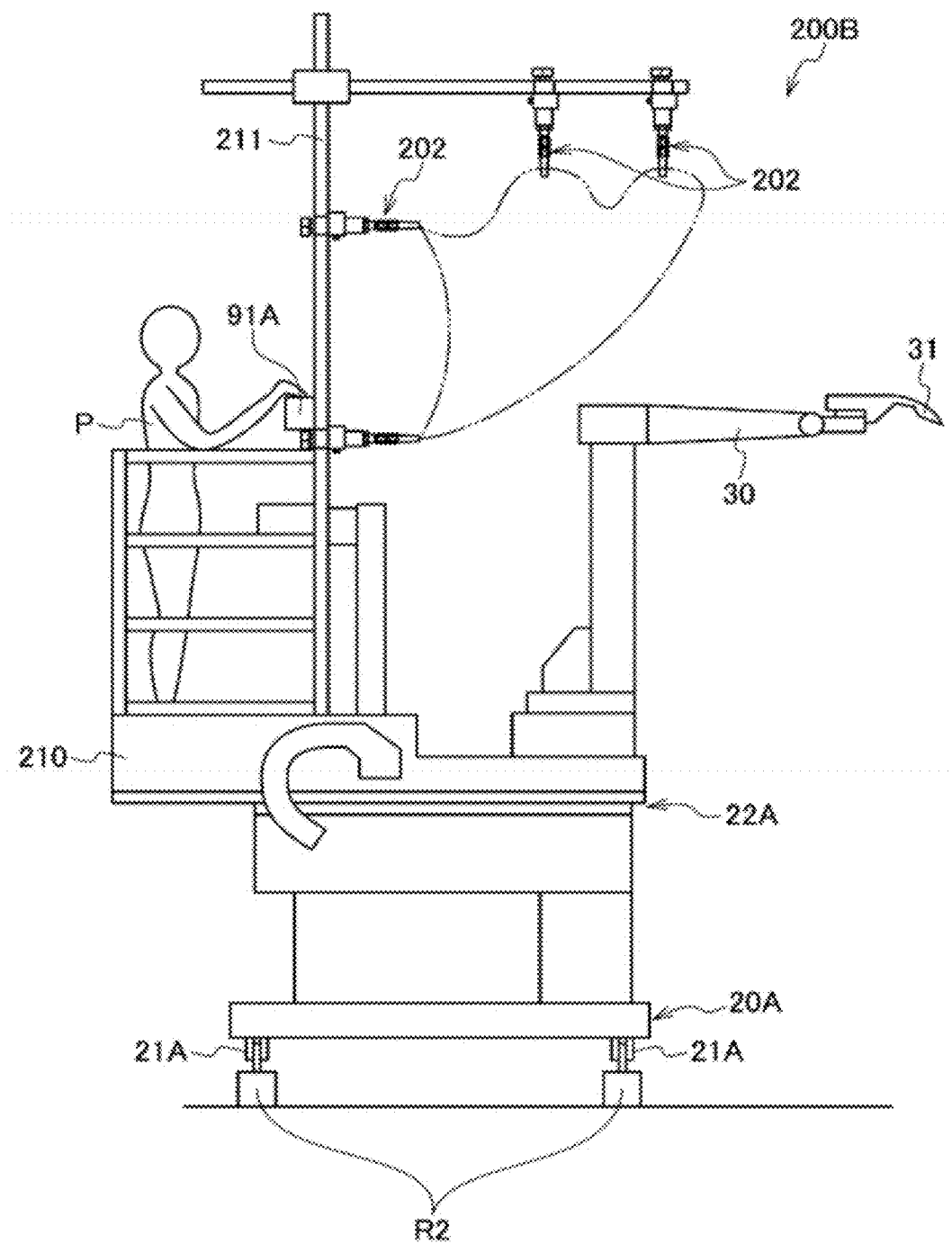
FIG. 13 is a side view of a preheating device according to a modification, which is disposed on a carriage.

A preheating device 200B according to a modification is provided independently on a special carriage 20A. As shown in FIG. 13, the special carriage 20A is configured to be able to move along carriage moving rails R2 with wheels 21A provided in a lower portion of the carriage 20A. That is, the carriage 20A is provided movably in a longitudinal direction of the steel structure W as shown in FIG. 1.

A slider mechanism 22A is provided on the top of the carriage 20A as shown in FIG. 13. A boarding platform 210 which a worker P can board is mounted on the top of the slider mechanism 22A. The boarding platform 210 can move in a direction perpendicular to the longitudinal direction of the steel structure W due to the slider mechanism 22A. In addition, a preheating torch holding arm 211 is provided erectly on the boarding platform 210. A plurality (four in FIG. 13) of preheating torches 202 are fixed to the preheating torch holding arm 211. In addition, an input unit 91A is disposed on the boarding platform 210 and near the worker P. The worker P can set a preheating temperature and so on through the input unit 91A. The preheating device 200B preheats the weld portion of the steel structure W to a set preheating temperature by the preheating torches 202.

According to another modification of the preheating device, a welding robot exclusively used for preheating may be provided in addition to the welding robot for welding, and a preheating torch may be provided at an end of the welding robot.

Second Embodiment

Figure 14:
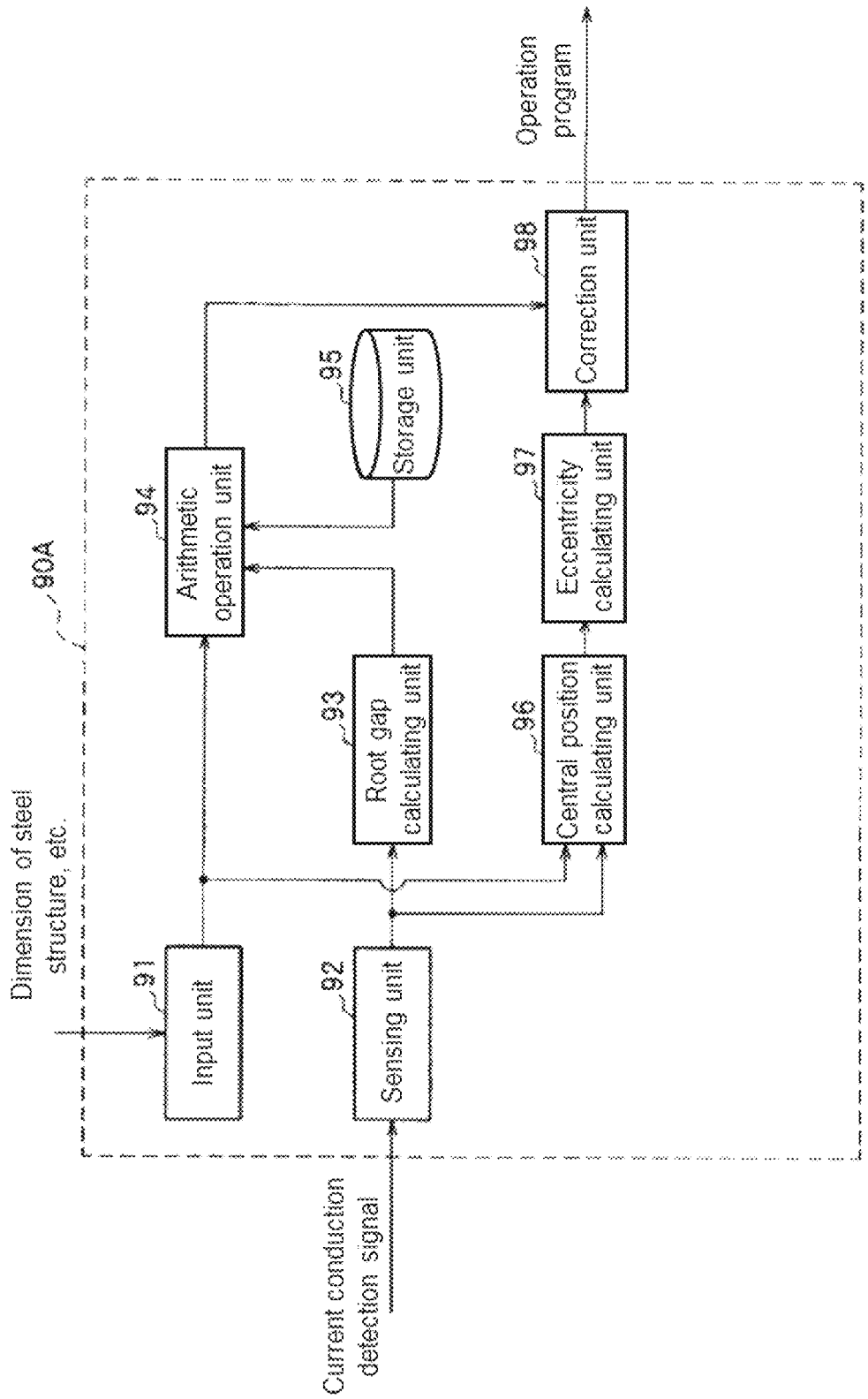
FIG. 14 is a block diagram showing a configuration of a welding control device provided in a welding device according to a second embodiment of the invention.

A welding device 1A according to a second embodiment of the invention will be described below with reference to FIG. 14. The welding device 1A has the same configuration as the welding device 1 according to the first embodiment, except that a welding control device 90A is provided in place of the welding control device 90, as shown in FIG. 1 and FIG. 14. Accordingly, different points from the welding device 1 will be mainly explained below, and detailed description about constituents overlapped with those of the welding device 1 and a processing procedure of the welding device 1A will be omitted.

In the welding control device 90A, a function of correcting the operation program based on eccentricity of the steel structure W is added to the aforementioned welding control device 90. As shown in FIG. 14, the welding control device 90A has a central position calculating unit 96, an eccentricity calculating unit 97, and a correction unit 98 in addition to the input unit 91, the sensing unit 92, the root gap calculating unit 93, the arithmetic operation unit 94, and the storage unit 95.

The central position calculating unit 96 calculates the central position of the steel structure W. Specifically as shown in FIG. 14, the central position calculating unit 96 calculates the central position of the steel structure W from the dimensions of the steel structure W inputted through the input unit 91, and the position coordinates of the steel structure W detected by the sensing unit 92. Then the central position calculating unit 96 outputs the central position of the steel structure W to the eccentricity calculating unit 97 as shown in FIG. 14.

The eccentricity calculating unit 97 calculates eccentricity of the steel structure W. Specifically the eccentricity calculating unit 97 calculates the eccentricity from the position coordinates of the rotation center position of each rotary positioner 10 set in advance, and the central position of the steel structure W calculated by the central position calculating unit 96. The eccentricity is an amount of deviation of the steel structure W relative to the rotation center of the rotary positioner 10. Then the eccentricity calculating unit 97 outputs the eccentricity of the steel structure W to the correction unit 98 as shown in FIG. 14.

The correction unit 98 corrects the robot operation orbit provided by the arithmetic operation unit 94. Specifically as shown in FIG. 8, the correction unit 98 corrects the robot operation orbit included in the operation program provided by the operation program providing unit 943 (see FIG. 10) of the arithmetic operation unit 94, in accordance with the eccentricity calculated by the eccentricity calculating unit 97. That is, although the operation program provided by the arithmetic operation unit 94 is provided on the assumption that the eccentricity of the steel structure W with respect to the rotation center of the rotary positioner 10 is zero, the operation program can be corrected by the correction unit 98 based on the eccentricity. A specific example of a method for correcting the robot operation orbit by the correction unit 98 may include a method in which correction data of the robot operation orbit in accordance with each eccentricity are experimentally determined in advance, and a piece of correction data is selected and used in accordance with the eccentricity calculated by the eccentricity calculating unit 97. Then the correction unit 98 outputs the operation program corrected thus to the welding robot 30.

In the welding device 1A configured thus, the central position of the steel structure W can be calculated by the central position calculating unit 96, and the eccentricity of the steel structure W can be calculated by the eccentricity calculating unit 97. Thus, the welded apparatus 1A can perform welding correctly even if the steel structure W is rotated with eccentricity by the rotary positioners 10.

Third Embodiment

Figure 15:
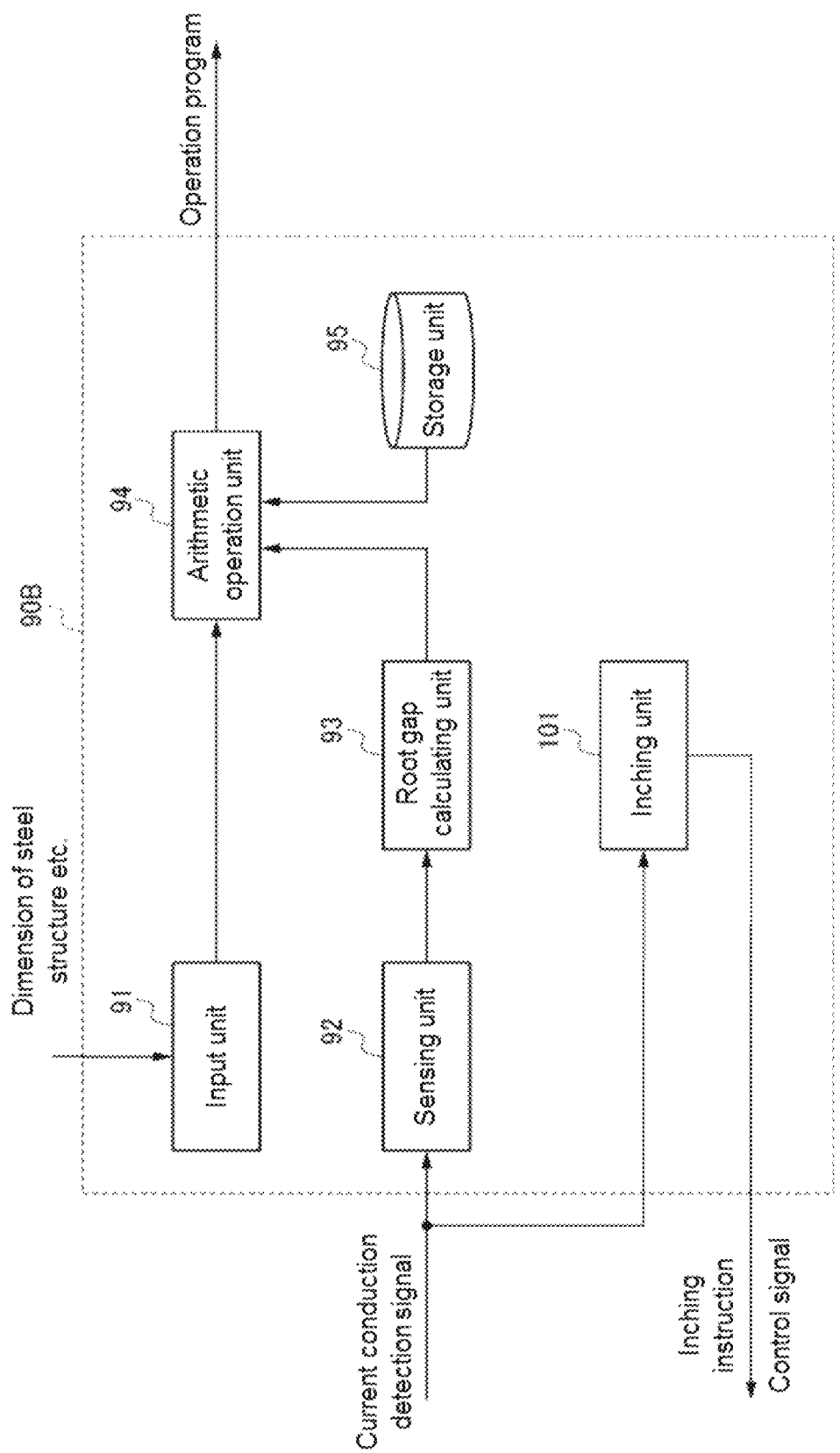
FIG. 15 is a block diagram showing a configuration of a welding control device provided in a welding device according to a third embodiment of the invention.

A welding device 1B according to a third embodiment of the invention will be described below with reference to FIG. 15 to FIG. 17F. The welding device 1B has the same configuration as the welding device 1 according to the first embodiment, except that a welding control device 90B is provided in place of the welding control device 90, as shown in FIG. 1 and FIG. 15. Accordingly, different points from the welding device 1 will be mainly explained below, and detailed description about constituents overlapped with those of the welding device 1 and a processing procedure of the welding device 1B will be omitted.

In the welding control device 90B, a function of inching to the steel structure W is added to the aforementioned welding control device 90. As shown in FIG. 15, the welding control device 90B has an inching unit 101 in addition to the input unit 91, the sensing unit 92, the root gap calculating unit 93, the arithmetic operation unit 94, and the storage unit 95.

The inching unit 101 inches the welding wire protruding from the welding torch 31. Specifically the inching unit 101 performs inching operation at the welding start position of the welding torch 31 so that the welding wire to which a sensing voltage is applied is moved toward the steel structure W. Next, the inching unit 101 detects short-circuit as soon as the end of the welding wire touches the steel structure W, and confirms current conduction between the welding wire and the steel structure W. Next, the inching unit 101 performs operation for inching the welding wire in an opposite direction by a predetermined length. The inching unit 101 supplies predetermined welding power to the welding wire at the welding start position of the welding torch 31, generates a control signal to ignite an arc to thereby start welding, and outputs the control signal to the welding robot 30 as shown in FIG. 15.

An example of the inching operation by the inching unit 101 will be described below with reference to FIG. 16A to FIG. 16F and FIG. 17A to FIG. 17F. The following description will be made about a case where the steel structure W is constituted by a steel structure part (column) W3 and a steel structure part (diaphragm) W4, an L-shaped groove is formed between the two parts, and a backing member BM is disposed on a bottom portion of the groove, as shown in FIG. 16A to FIG. 16F and FIG. 17A to FIG. 17F.

Figure 16A:
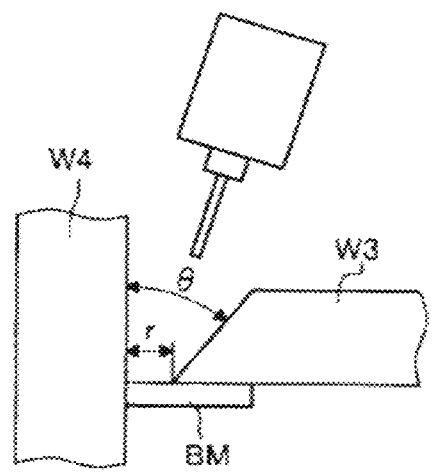
FIG. 16A is a schematic view showing a procedure of an inching operation performed by the welding control device provided in the welding device according to the third embodiment of the invention.
Figure 16B:
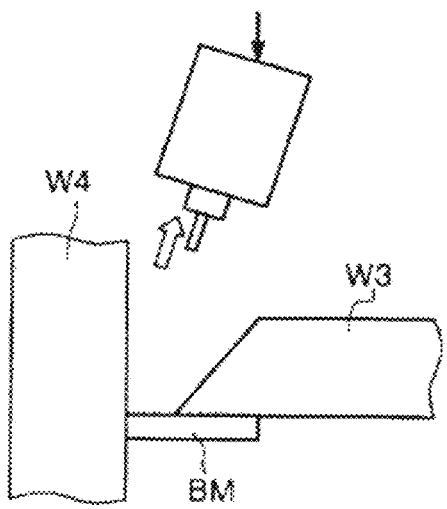
FIG. 16B is a schematic view showing the procedure of the inching operation performed by the welding control device provided in the welding device according to the third embodiment of the invention.

First, before the welding torch 31 in an initial state as shown in FIG. 16A is moved to reach the groove which is a joint portion between the steel structure part W3 and the steel structure part W4 in an arc start position and where the backing member BM is disposed, the inching unit 101 cuts the welding wire or performs reverse inching operation on the welding wire to make the extension of the welding wire at the end of the welding torch 31 shorter than the extension during welding, as shown in FIG. 16B. In FIG. 16A, 0 represents an angle of the groove, and r designates a root gap.

Figure 16C:
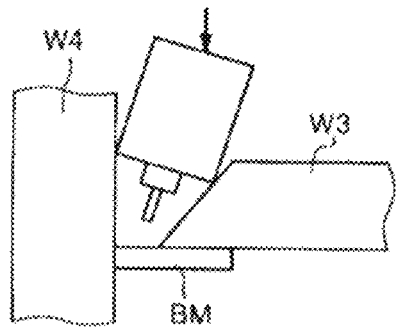
FIG. 16C is a schematic view showing the procedure of the inching operation performed by the welding control device provided in the welding device according to the third embodiment of the invention.

Next, as shown in FIG. 16C, the inching unit 101 moves the welding torch 31, in which the welding wire at the end of the welding torch 31 is made shorter than the extension during welding, to the arc start position. In this state, a sensing voltage is applied to the welding wire to perform wire inching operation.

Figure 16D:
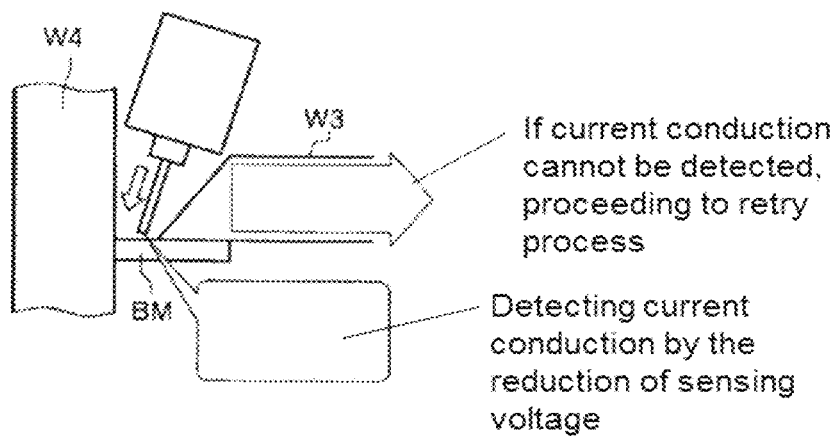
FIG. 16D is a schematic view showing the procedure of the inching operation performed by the welding control device provided in the welding device according to the third embodiment of the invention.
Figure 16E:
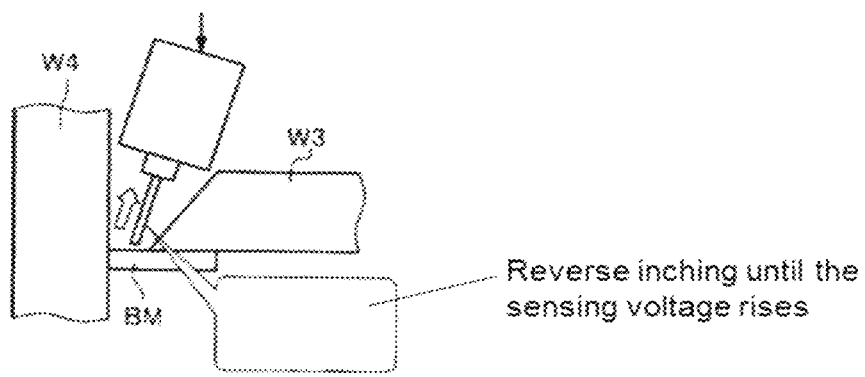
FIG. 16E is a schematic view showing the procedure of the inching operation performed by the welding control device provided in the welding device according to the third embodiment of the invention.
Figure 16F:
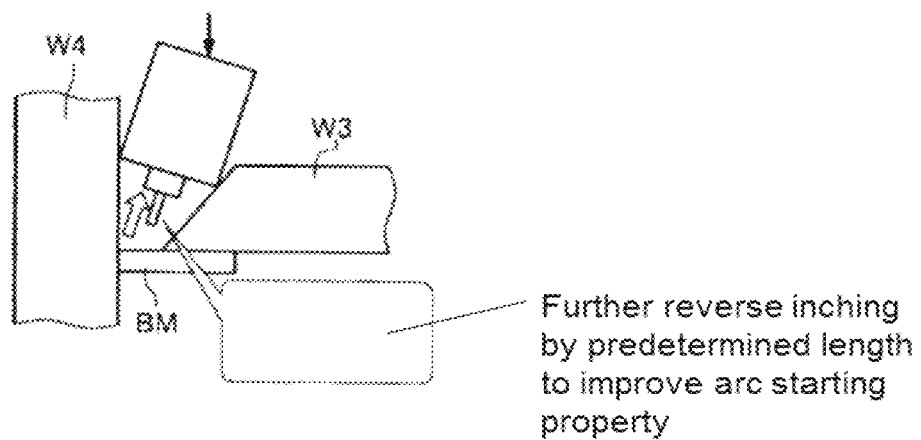
FIG. 16F is a schematic view showing the procedure of the inching operation performed by the welding control device provided in the welding device according to the third embodiment of the invention.

Next, during the inching operation on the welding wire, the inching unit 101 detects decrease of the sensing voltage to thereby detect current conduction between the welding wire and each of the steel structure parts W3 and W4 as shown in FIG. 16D before the inching operation reaches a maximum wire inching amount, for example, 20 mm. When the welding start position can be detected thus, the inching unit 101 performs inching operation in an opposite direction until the welding wire leaves the steel structure parts W3 and W4 to thereby increase the sensing voltage, as shown in FIG. 16E. Then the inching unit 101 performs inching operation on the welding wire in the opposite direction by a predetermined length, for example, 5 mm, to thereby improve an arc starting property, as shown in FIG. 16F. After that, the inching unit 101 starts an arc to start welding.

Figure 17A:
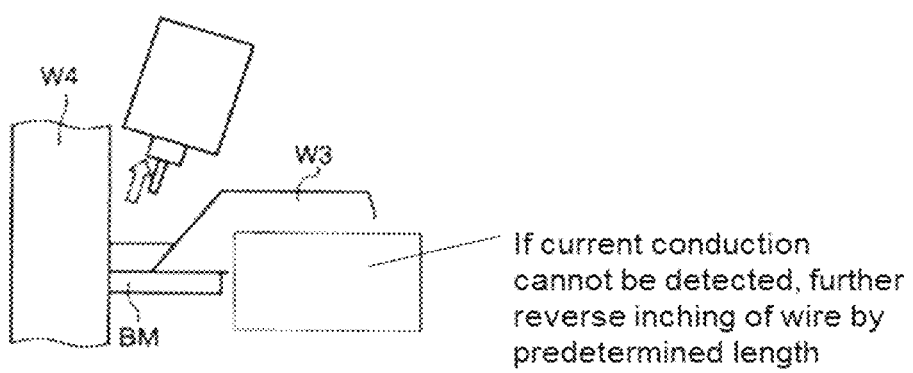
FIG. 17A is a schematic view showing the procedure of the inching operation performed by the welding control device provided in the welding device according to the third embodiment of the invention.
Figure 17B:
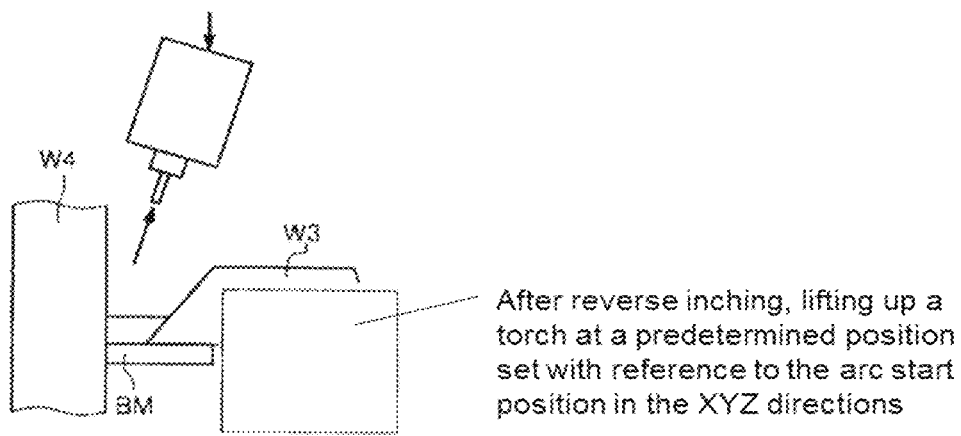
FIG. 17B is a schematic view showing the procedure of the inching operation performed by the welding control device provided in the welding device according to the third embodiment of the invention.

Here, even if the inching operation reaches the maximum wire inching amount, there may be a case where the current conduction between the welding wire and each steel structure part W3, W4 cannot be detected during the inching operation on the welding wire. When the number of retrieving times for the predetermined position where the arc can be started is, for example, smaller than three, the inching unit 101 concludes that current conduction cannot be detected at the present position, and the inching unit 101 tries to retrieve again at a different position, as shown in FIG. 16D. In addition, the inching unit 101 lifts up the welding torch 31 by a predetermined distance, for example, 5 mm as shown in FIG. 17A, and performs inching operation on the welding wire in the opposite direction, for example, by 15 mm, so as to lift up the welding torch 31 to a position set with reference to the arc start position in the XYZ directions as shown in FIG. 17B.

Figure 17C:
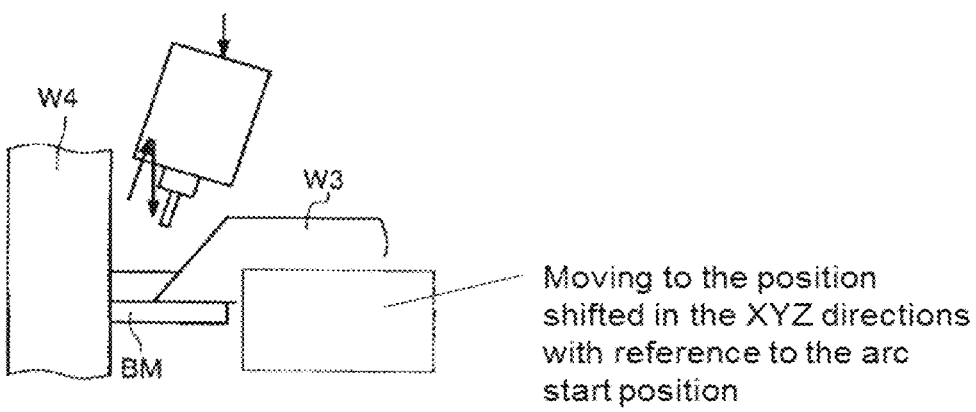
FIG. 17C is a schematic view showing the procedure of the inching operation performed by the welding control device provided in the welding device according to the third embodiment of the invention.
Figure 17D:
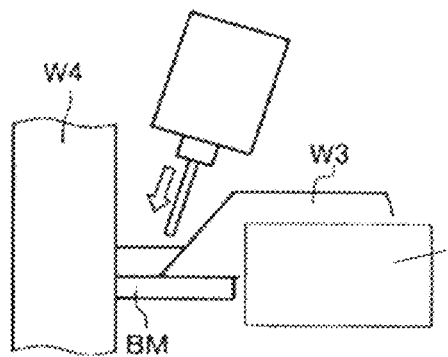
FIG. 17D is a schematic view showing the procedure of the inching operation performed by the welding control device provided in the welding device according to the third embodiment of the invention.
Figure 17E:
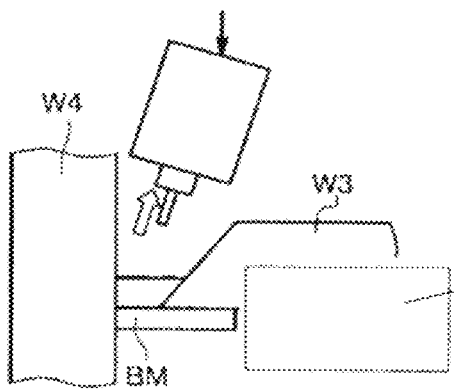
FIG. 17E is a schematic view showing the procedure of the inching operation performed by the welding control device provided in the welding device according to the third embodiment of the invention.
Figure 17F:
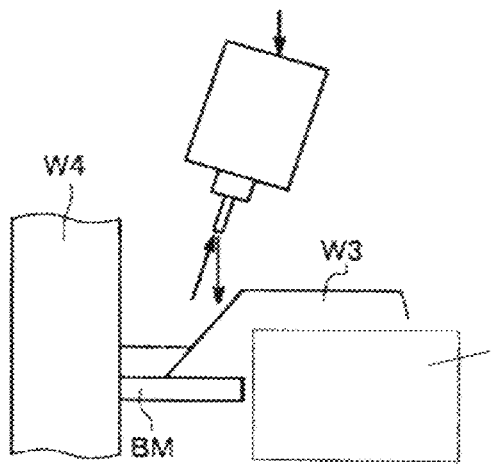
FIG. 17F is a schematic view showing the procedure of the inching operation performed by the welding control device provided in the welding device according to the third embodiment of the invention.

Next, the inching unit 101 moves the welding wire to a position which is different from the aforementioned welding start position and shifted in the XYZ directions by a predetermined distance, for example, a position leaving a wall, for example, by a shift quantity of 0 mm in a weld line advancing direction and a shift quantity of 1 mm in a weld line left/right direction as shown in FIG. 17C. At this position, the inching unit 101 applies the sensing voltage again to perform operation for confirming current conduction, as shown in FIG. 17D. Here, as shown in FIG. 17E, when the current conduction between the welding wire and each steel structure part W3, W4 cannot be detected by the operation for confirming the current conduction, the inching unit 101 performs inching operation on the welding wire again in the opposite direction by the predetermined length. Then, as shown in FIG. 17F, the inching unit 101 lifts up the welding wire, and repeats the operation for confirming the current conduction until the detection of the current conduction or a predetermined number of times set in advance. The aforementioned position which is different from the welding start position is a position near the welding start position but another position than the welding start position, meaning that welding can be started at the position without any problem.

On the other hand, even if the inching operation reaches the maximum wire inching amount, there is a case that the current conduction between the welding wire and each steel structure part W3, W4 cannot be detected during the inching operation of the welding wire. In this case, when the number of retrieving times for the position where the arc can be started exceeds a predetermined one, for example, three, the inching unit 101 concludes that the arc start position cannot be detected, and moves to error processing. Incidentally, description of the error processing will be omitted here.

The welding device 1B having the aforementioned configuration is provided with the inching unit 101 so that whether an arc can be generated or not can be confirmed before the start of welding. Thus, the arc can be started surely at the welding start position.

Fourth Embodiment

A welding device according to a fourth embodiment of the invention will be described below with reference to FIG. 18. The welding device 1C according to the fourth embodiment is characterized by including two welding robots 30. That is, the welding device 1C according to the fourth embodiment has another set of a carriage 20, a welding robot 30, a wire supply vessel 40, a nozzle exchanging device 50, a nozzle cleaning device 60, a slag removing device 70, a wire cutting device 80 and a preheating device 200 in addition to the configuration of the welding device 1 shown in FIG. 1. In addition, the welding device 1C according to the fourth embodiment is arranged so that those devices can be controlled by a single welding control device 90C. Here, the other configuration than the welding control device in the welding device 1C according to the fourth embodiment has been already described. Thus, description thereof will be omitted.

The welding control device 90C in the welding device according to the fourth embodiment has an arithmetic operation unit 94C in addition to the input unit 91, the sensing unit 92, the root gap calculating unit 93 and the storage unit 95 as shown in the aforementioned FIG. 8. In addition, this arithmetic operation unit 94C has a welding condition correcting unit 944 in addition to the lamination pattern determining unit 941, the welding/preheating condition determining unit 942 and the operation program providing unit 943 as shown in FIG. 18. Here, the other configuration than the arithmetic unit 94C in the welding control device 90C and the other configuration than the welding condition correcting unit 944 in the arithmetic operation unit 94C have been already described, and description thereof will be omitted.

The welding condition correcting unit 944 corrects the welding conditions determined by the welding/preheating condition determining unit 942. Specifically the welding condition correcting unit 944 changes the feeding amount of the welding wire included in the welding conditions determined by the welding/preheating condition determining unit 942 in order to equalize the welding time from one base point to another when different sectional areas and/or different welding lengths are present in the same steel structure W and hence a plurality of welding joints having different volumes to be welded are welded concurrently by two welding robots 30. Thus, the welding condition correcting unit 944 can compensate the difference in volume to be welded among the welding joints.

Specific processing in the welding condition correcting unit 944 will be described below. Here, preparation is performed as a preliminary stage of the processing in the welding condition correcting unit 944, as follows. First, a relation between a welding current and a proper arc voltage for a wire feeding rate with a predetermined extension is obtained in advance. Next, a relation between the welding current and the proper arc voltage for the wire feeding rate when the extension is increased or decreased is obtained. Then, in a case of the predetermined extension and a reference root gap, welding conditions (i.e., reference welding conditions, that is, a welding current, an arc voltage, a welding speed, and a target position) for each plate thickness are obtained by experiments and so on. Further, a changeable range of the welding current and an arc voltage corresponding thereto are obtained for the pass of welding (or each pass of multilayer welding) (i.e., welding current range). In this case, it is considered that a lamination pattern, a welding current and a welding speed for a thin plate thickness (the same throat thickness among the passes) are often the same as those until the midway of a thick plate thickness. However, the conditions may be set individually for each plate thickness in the same manner as those for a pass near finishing. Those pieces of information are stored in the storage unit 95 so that they can be outputted to the welding condition correcting unit 944, as shown in FIG. 18.

After the preparation is thus-performed, the welding condition correcting unit 944 performs processing as follows. First, as for a pass where welding is performed by the two welding robots 30 concurrently, there is a case that the throat thickness is fixed on the reference welding conditions after the pass is terminated, that is, there is a case that the lamination pattern, the welding current and the welding speed are fixed. In this case, the welding condition correcting unit 944 determines an amount of deposited metal required for welding between one base point and another on the assumption that the throat thickness on the reference welding conditions is kept, from the respective reference welding conditions, a root gap of each welding joint, and if there is a pass where welding has been performed before, a throat thickness welded till then. The welding condition correcting unit 944 determines an average value of the amounts of deposited metal thus-obtained, as an amount of deposited metal to be intended (an intended amount of deposited metal).

Next, from the relation between the wire feeding rate and the welding current obtained in advance, the welding condition correcting unit 944 determines a welding time corresponding to the intended amount of deposited metal when the current value of the reference welding conditions for the pass is used. In this case, for a straight part of the steel structure W, the welding condition correcting unit 944 calculates the welding speed from the welding length between base points. On the other hand, for an arc part (corner portion) of the steel structure W, since the welding time corresponds to the rotating time of the rotary positioners 10, the welding condition correcting unit 944 determines a welding length corresponding to the welding position where welding is performed this time, in consideration of a difference from the throat thickness determined till then, and calculates a welding speed (relative speed between the steel structure W and the welding torch 31) Next, the welding condition correcting unit 944 determines a wire feeding rate required for each welding joint from the obtained welding speed and the amount of deposited metal required in the pass for each welding joint, and determines an actual current value and an arc voltage corresponding thereto from the relation between the wire feeding rate and the welding current obtained in advance.

On the other hand, as for a pass where welding is performed by the two welding robots 30 concurrently, there is a case that the throat thickness is varied on the reference welding conditions after the pass is terminated, that is, there is a case that the lamination pattern, the welding current and the welding speed are varied. In this case, the welding condition correcting unit 944 determines an amount of deposited metal required for welding between one base point and another on the assumption that the throat thickness on the reference welding conditions for each welding joint is kept, from the respective reference welding conditions, a root gap of the welding joint, and if there is a pass where welding has been performed before, a throat thickness welded till then. The welding condition correcting unit 944 determines an average value of the amounts of deposited metal thus-determined, as an amount of deposited metal to be intended (i.e., an intended amount of deposited metal).

Next, the welding condition correcting unit 944 determines a wire feeding rate for each current value in the path where welding is to be performed concurrently, from the respective reference welding conditions, and determines an average value of wire feeding rates thus-determined. The welding condition correcting unit 944 sets the average value as an average wire feeding rate. Next, the welding condition correcting unit 944 determines a welding time in this time from the intended amount of deposited metal and the average wire feeding rate. In this case, for a straight part of the steel structure W, the welding condition correcting unit 944 calculates a welding speed from the welding length between base points and the welding time. On the other hand, for an arc part (i.e., corner portion) of the steel structure W, since the welding time corresponds to the rotating time of the rotary positioners 10, the welding condition correcting unit 944 determines a welding length corresponding to the welding position where welding is performed this time, in consideration of a difference from the throat thickness determined till then, and calculates a welding speed (i.e., relative speed between the steel structure W and the welding torch 31). Next, the welding condition correcting unit 944 determines a wire feeding rate required for each welding joint from the determined welding speed and the amount of deposited metal required in the pass for the welding joint, and determines an actual current value and an arc voltage corresponding thereto from the relation between the wire feeding rate and the welding current obtained in advance.

In this manner, in the welding device according to the fourth embodiment, the feeding amounts of the welding wire of the welding robots 30 are made different from, so that a plurality of welding joints having different volumes to be welded can be welded concurrently by the welding robots 30.

Here, the welding condition correcting unit 944 preferably provides a proper welding current range in which welding can be performed in each pass, performs welding within the proper welding current range, and compensates a difference in thickness generated as a result in subsequent passes. In this manner, the welding condition correcting unit 944 corrects welding conditions so that the total thickness can be put within a predetermined value. That is, when the welding current is changed within the predetermined welding current range and welding is performed with a change of thickness, the amount of deposited metal in each pass for each welding joint does not agree with a desired value, but in this case, the shortage of the amount of deposited metal or the excess of the amount of deposited metal is carried forward to the next pass. In addition, when the throat thickness for the present pass is 0 or less, welding is performed with its lower limit value, and the excess of the amount of deposited metal is carried forward to the next pass. Accordingly, the welding condition correcting unit 944 sets an amount determined by adding an carried-forward error to the intended amount of deposited metal, as an amount of deposited metal required in the next pass for the welding joint, and performs similar processing to the aforementioned processing.

In this manner, the welding device according to the fourth embodiment compensates, in a subsequent pass, a difference of thickness generated in welding so as to determine the total thickness within a desired value. Thus, a plurality of welding joints can be welded concurrently efficiently and properly by a plurality of welding robots 30.

In addition, when welding cannot be performed within a proper welding current range where welding can be performed in each path, it is preferable that the welding condition correcting unit 944 welds the welding joints individually in at least one pass so as to correct the welding conditions to thereby compensate the total error in thickness. That is, when the difference in the amount of deposited metal among a plurality of welding joints increases, there is a case where an error occurs in the amount of deposited metal in each welding joint as a result of welding at the termination of all the passes and an intended welding quality cannot be obtained. In this case, the welding condition correcting unit 944 inhibits concurrent welding in one or more passes, that is, inhibits concurrent welding of at least one welding joint of the welding joints, and calculates again the rotating speed (i.e., welding speed) of the rotary positioners 10 in accordance with the remaining amount of deposited metal required before the pass on the assumption of the welding current in the reference welding conditions. Welding is performed based on the welding conditions corrected thus. Before or after the welding of this welding joint, welding in this pass for the other welding joints in this case is performed.

In this manner, the welding device according to the fourth embodiment welds the welding joints individually in at least one of the passes so as to compensate the total error of thickness. Thus, even if there is a large difference in volume to be welded between base points among the welding joints, the welding joints can be welded concurrently efficiently and properly by the welding robots 30.

In addition, when welding cannot be performed within a proper welding current range where welding can be performed in each pass, it is preferable that the welding condition correcting unit 944 changes the welding conditions to increase a difference in wire feeding amount to thereby change the extension of the welding wire so that the welding current which may be out of the proper range can be set at a desired value. That is, since the aforementioned welding current range is limited, the number of passes where welding cannot be performed concurrently increases when the difference in the amount of deposited metal increases among the welding joints. When the number of passes where welding cannot be performed concurrently increases thus, the operating time approaches that in a case where the welding joints are welded individually, so as to reduce the effect of the concurrent welding. Accordingly, when the amount of deposited metal cannot be set at a desired value even if the current value is set at its upper or lower limit value, the welding condition correcting unit 944 changes the wire extension to thereby set the amount of deposition at the desired value while keeping the welding current within the proper range. That is, a change in correlation of the welding current and the arc voltage corresponding to a change in the extension is obtained in advance by experiments and so on. The welding condition correcting unit 944 changes the extension so that the welding current value corresponding to the wire feeding amount determined from the welding speed and the amount of deposited metal can be put within the current range. Thus, concurrent welding can be achieved while keeping the proper welding conditions.

In this manner, the welding device according to the fourth embodiment changes the extension of the welding wire for each of a plurality of welding robots 30. Thus, the welding joints can be welded by the welding robots 30 concurrently efficiently, with the welding current kept proper.

Figure 18:
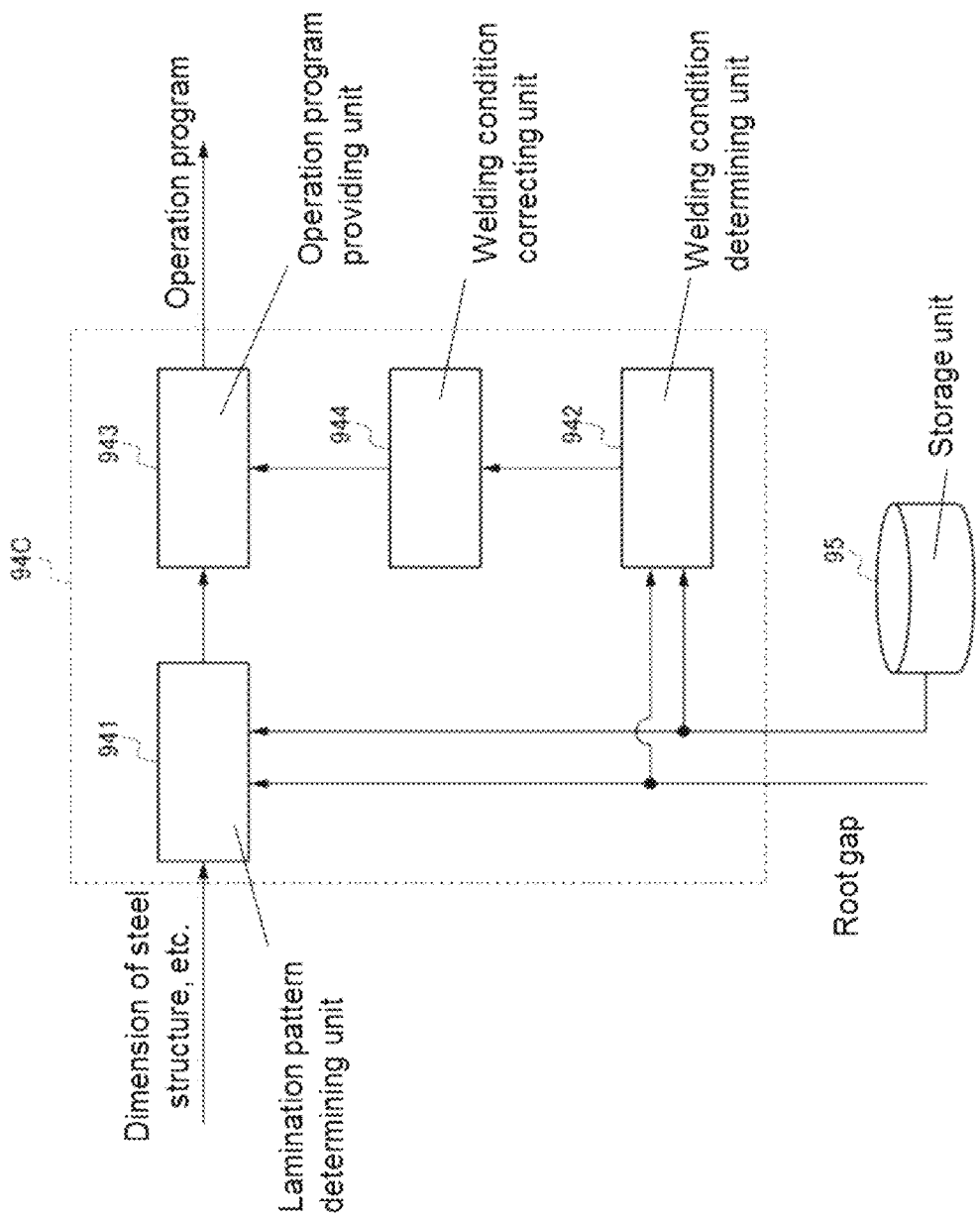
FIG. 18 is a block diagram showing a configuration of an arithmetic unit of a welding control device provided in a welding device according to the fourth embodiment of the invention.

The welding condition correcting unit 944 outputs the welding conditions corrected thus, to the operation program providing unit 943 as shown in FIG. 18. Then the operation program providing unit 943 provides a robot operation program for each welding robot 30 in accordance with the lamination pattern determined by the lamination pattern determining unit 941 and the welding conditions corrected by the welding condition correcting unit 944, and outputs the robot operation program to the welding robot 30 so as to set the robot operation program therein.

The welding device 1C configured thus according to the fourth embodiment can automatically provide operation orbits and welding conditions for a plurality of welding robots 30 based on information such as dimensions of the steel structure W inputted to the input unit 91 of the welding control device 90C.

In addition, when the steel structure W is held by the pair of rotary positioners 10 and different straight parts of the steel structure W are welded by welding robots 30 provided on carriages 20 respectively, the welding device 1C according to the fourth embodiment can perform welding by the welding robots 30 without rotating the steel structure W. When different arc parts (i.e., corner portions) of the steel structure W are welded by the welding robots 30 provided on the carriages 20 respectively, the welding device 1C can perform welding by the welding robots 30 while rotating the steel structure W. Thus, the welding device 1C according to the fourth embodiment can weld not only the straight parts of the steel structure W but also the arc parts thereof continuously without disconnecting an arc for welding.

Although the welding device according to the invention has been described specifically along the mode for carrying out the invention, the gist of the invention is not limited to the description. The gist of the invention must be interpreted broadly based on the scope of claims. In addition, not to say, various changes, modifications, etc. based on the description are also included in the gist of the invention.

For example, although the nozzle attaching/detaching mechanism 52 merely serves for attaching/detaching the nozzle 311 of the welding torch 31 as shown in FIG. 5A to FIG. 5C, the nozzle cleaning device 60 may be, for example, arranged to automatically clean an inner surface (i.e., inner circumferential surface) of the removed nozzle 311 with a wire brush or the like. Thus, spatters adhering to the inner surface of the nozzle 311 can be removed so that deterioration in shieldability can be prevented more effectively.

Although each welding device 1A, 1B has been described about a case where one welding robot 30 is provided (see FIG. 1), the welding device 1A, 1B may be applied to a case where two welding robots 30 are provided as in the welding device according to the fourth embodiment. In this case, the central position calculating unit 96, the eccentricity calculating unit 97 and the correction unit 98 of the welding device 1A are added into the welding control device 90C (see FIG. 8) of the welding device according to the fourth embodiment, so that the operation program can be corrected based on the eccentricity of the steel structure W.

Although the welding device 1B has been described about the case where one welding robot 30 is provided (see FIG. 1), the welding device 1B may be applied to the case where two welding robots 30 are provided as in the welding device according to the fourth embodiment. In this case, the inching unit 101 of the welding device 1B is added into the welding control device 90C (see FIG. 18) of the welding device according to the fourth embodiment, so that inching operations can be performed respectively on the welding wires protruding from the two welding torches 31.

Here, when the inching unit 101 of the welding device 1B is added into the welding control device 90C (see FIG. 18), specifically the inching unit 101 performs inching operations so that the welding wires to which sensing voltages are applied is advanced toward the steel structure parts W3 and W4 at the welding start positions of the welding torches 31 provided at the ends of the welding robots 30 on the carriages 20 respectively. Next, the inching unit 101 detects short-circuit as soon as the end of each welding wire touches each steel structure part W3, W4. Thus, the inching unit 101 confirms current conduction between the welding wire and the steel structure part W3, W4. Next, the inching unit 101 inches each welding wire in the opposite direction by a predetermined length. Then the inching unit 101 supplies predetermined welding electric power to the welding wires concurrently and respectively at the welding start positions of the welding torches 31, generates control signals to ignite arcs to start welding, and outputs the control signals to the welding robots 30. Thus, whether arcs can be generated or not can be confirmed before the start of welding, and start timings of the arcs can be synchronized by a plurality of welding robots 30 while the arcs can be started surely at the welding start positions respectively.

In addition, for example, the welding control device according to the invention can edit preheating timings as preheating conditions when a plurality of welding joints are welded. The welding control device can selectively use a method in which preheating and welding are performed alternately for each welding joint, or a method in which all the welding joints are welded after all the welding joints are preheated.

The present application is based on a Japanese patent application (Japanese Patent Application No. 2016-147869) filed on Jul. 27, 2016, the contents of which are incorporated herein by reference.

DESCRIPTION OF REFERENCE NUMERALS AND SIGNS

C groove depth
P worker
$P_1$ detection start position
W steel structure (workpiece)

W1, W2, W3, W4 steel structure part (workpiece)
W1a, W2a groove face
r distance (root gap)
1, 1A, 1B, 1C welding device
10 rotary positioner
11 annular holding member
20, 20A carriage
30 welding robot
31 welding torch
32 arm portion end (end of welding robot)
40 wire supply vessel
50 nozzle exchanging device
60 nozzle cleaning device
70 slag removing device
80 wire cutting device
90, 90A, 90B, 90C welding control device
91, 91A input unit
92 sensing unit (laser sensor)
93 root gap calculating unit
96 central position calculating unit
97 eccentricity calculating unit
98 correction unit
111 fixing jig
132 driving member
200, 200B preheating device
202 preheating torch
203 temperature sensor
311 nozzle
521 coil spring
524 rotary drive source

The invention claimed is:

1. A welding device for welding a workpiece using a welding robot, comprising:
   a welding control device that controls operation of the welding robot;
   a preheating device that preheats the workpiece, the preheating device includes a preheating torch;
   a pair of rotary positioners that are provided movably in a longitudinal direction of the workpiece and hold and rotate the workpiece;
   a carriage, provided movably in a parallel direction to the direction in which the pair of rotary positioners move;
   the welding robot, provided on the carriage movably in a perpendicular direction to the direction in which the rotary positioners move; and
   a welding torch, provided at an end of the welding robot,
   wherein the welding control device is configured to receive an input of at least one or both of dimensions of the workpiece and a shape of a welding joint, and preheating information,
   wherein the welding control device including a storage unit that includes at least welding robot operation orbit teaching data, welding condition data, and preheating condition data,
   wherein the welding control device automatically provides a preheating condition, a welding robot operation orbit, and a welding condition for the welding joint to be welded based on one or both of the dimensions of the workpiece and the shape of the welding joint, and the preheating information, and based on the welding robot operation orbit teaching data, the welding condition data and the preheating condition data prepared in advance in the storage unit, and preheating and welding are performed
   wherein the pair of rotary positioners include:
      a pair of annular holding members that receive the workpiece internally and hold the workpiece with a plurality of fixing jigs; and
      a driving member configured to rotate one or both of the pair of annular holding members, and
   wherein each of the annular holding members is divided at a predetermined position of an annular portion to form a part of the annular portion to be open, so that the workpiece can be received in the annular holding members.

2. The welding device according to claim 1,
wherein
the preheating torch is at least provided on a preheating torch carriage that can move in a longitudinal direction of the workpiece, provided exclusively at an end of the welding robot, or provided at an end of the welding robot replaceably by the preheating torch.

3. The welding device according to claim 1,
wherein the preheating condition includes a preheating temperature, and
the preheating temperature is measured by a temperature sensor, and controlled by the preheating device to reach a set preheating temperature determined in advance through input by a worker.

4. The welding device according to claim 1,
wherein the carriage is one of a plurality of carriages, provided movably in a parallel direction to the direction in which the pair of rotary positioners move,
wherein the welding robots, provided on the plurality of carriages respectively, are movable in a perpendicular direction to the direction in which the rotary positioners move, and
wherein one of the welding torch is provided at an end of each of the welding robots.

5. The welding device according to claim 1,
wherein the welding control device is configured to detect a position of the workpiece by applying a sensing voltage between the welding torch supporting a welding wire set to have a predetermined extension and the workpiece, and detecting a current conduction state caused by contact between the welding wire and the workpiece, and
wherein the welding control device is configured to determine a root gap based on data of detected positions of both groove faces in a groove width direction from a detection start position of a predetermined depth relative to a set groove depth from at least one surface of the workpiece, the data of detected positions of the both groove faces being detected by the welding control device, a difference between the set groove depth and the detection start position, and preset angles of both of the groove faces.

6. The welding device according to claim 5,
wherein the welding control device automatically provides a lamination pattern, preheating conditions, heat input conditions, inter-pass temperature conditions and welding conditions for the welding joint to be welded, based on a lamination pattern, preheating conditions, heat input conditions and welding conditions prepared in advance for dimensions of the workpiece or for the dimensions and root gap of the workpiece, and a root gap determined through input or sensing.

7. A welding device for welding a workpiece using a welding robot, comprising:
   a welding control device that controls operation of the welding robot; and a preheating device that preheats the workpiece, the preheating device includes a preheating torch wherein the welding control device is configured to receive an input of at least one or both of dimensions of the workpiece and a shape of a welding joint, and preheating information, wherein the welding control device including a storage unit that includes at least welding robot operation orbit teaching data, welding condition data, and preheating condition data, wherein the welding control device automatically provides a preheating condition, a welding robot operation orbit, and a welding condition for the welding joint to be welded based on one or both of the dimensions of the workpiece and the shape of the welding joint, and the preheating information, and based on the welding robot operation orbit teaching data, the welding condition data and the preheating condition data prepared in advance in the storage unit, and preheating and welding are performed, wherein the welding control device edits preheating timings as the preheating conditions for welding the plurality of welding joints, and the welding control device selects one of a method in which preheating and welding are performed alternately for each of the plurality of welding joints, and a method in which all the welding joints are welded after all the plurality of welding joints are preheated.

8. A welding device for welding a workpiece using a welding robot, comprising:
a welding control device that controls operation of the welding robot;
a preheating device that preheats the workpiece, the preheating device includes a preheating torch;
a pair of rotary positioners that are provided movably in a longitudinal direction of the workpiece and hold and rotate the workpiece;
a carriage, provided movably in a parallel direction to the direction in which the pair of rotary positioners move;
the welding robot, provided on the carriage movably in a perpendicular direction to the direction in which the rotary positioners move; and
a welding torch, provided at an end of the welding robot,
wherein the welding control device is configured to receive an input of at least one or both of dimensions of the workpiece and a shape of a welding joint, and preheating information,
wherein the welding control device including a storage unit that includes at least welding condition data and preheating condition data,
wherein the welding control device automatically provides a preheating condition, a welding robot operation orbit, and a welding condition for the welding joint to be welded based on one or both of the dimensions of the workpiece and the shape of the welding joint, and the preheating information, and based on the welding condition data and the preheating condition data prepared in advance in the storage unit, and preheating and welding are performed,
wherein the pair of rotary positioners include:
a pair of annular holding members that receive the workpiece internally and hold the workpiece with a plurality of fixing jigs; and
a driving member configured to rotate one or both of the pair of annular holding members, and
wherein each of the annular holding members is divided at a predetermined position of an annular portion to form a part of the annular portion to be open, so that the workpiece can be received in the annular holding members.

9. The welding device according to claim 8, wherein the welding control device automatically provides a lamination pattern and welding conditions for the welding joint to be welded, based on a lamination pattern and welding conditions prepared in advance for dimensions of the workpiece or for the dimensions and root gap of the workpiece, and a root gap determined through input or sensing, and when a plurality of welding joints having different volumes to be welded due to different sectional areas of the workpiece or different welding lengths of the workpiece or both of them are welded concurrently by the plurality of welding robots, a feeding amount of the welding wire is controlled to be changed to compensate the difference in the volume to be welded in order to equalize a welding time from a base point to a next base point.

10. The welding device according to claim 9, wherein the welding control device sets a proper welding current range in which welding can be performed in each of passes, performs welding within the range in the pass, and makes control to compensate a difference in thickness generated as a result of the welding in another following pass so that the total thickness is within a desired range.

11. The welding device according to claim 9, wherein when welding cannot be performed within a proper welding current range in which welding can be performed in each of passes, the welding control device makes control to weld the welding joints individually in at least one of the passes so that a total error in thickness is compensated.

12. The welding device according to claim 9, wherein when welding cannot be performed within a proper welding current range in which welding can be performed in each of passes, the welding control device makes control to increase a difference in wire feeding amount and to change an extension of the welding wire so that a welding current being out of the proper range is set at a desired value.

13. The welding device according to claim 8, further comprising a nozzle exchanging device that exchanges a nozzle provided at an end of the welding torch,
the nozzle exchanging device including:
a coil spring to which the nozzle can be inserted; and
a rotary drive source that rotationally drives the coil spring, to which the nozzle is inserted, around a central axis of the coil spring, so as to remove the nozzle from a torch body of the welding torch.

14. The welding device according to claim 8, further comprising a slag removing device provided at an end of the welding robot, the slag removing device removing a slag generated in a weld portion of the workpiece.

15. The welding device according to claim 8, wherein the welding control device is:
configured to detect a position of the workpiece by applying a sensing voltage between the welding torch supporting a welding wire set to have a predetermined extension and the workpiece, and detecting a current conduction state caused by contact between the welding wire and the workpiece;
configured to calculate a central position of the workpiece based on dimensions of the workpiece inputted in advance, and the position of the workpiece detected by the welding control device;

configured to calculate an amount of eccentricity of the workpiece relative to a rotation center of each of the rotary positioners, based on rotation center positions of the rotary positioners inputted in advance, and the central position of the workpiece; and configured to correct the welding robot operation orbit based on the amount of eccentricity calculated by the welding control device.

16. The welding device according to claim 8, wherein the carriage is one of a plurality of carriages, provided movably in a parallel direction to the direction in which the pair of rotary positioners move, wherein the welding robots, provided on the plurality of carriages respectively, are movable in a perpendicular direction to the direction in which the rotary positioners move, and wherein one of the welding torch is provided at an end of each of the welding robots.

* * * * *